May 8, 1945.　　　　　G. WEBB　　　　　2,375,452
AUTOMATIC FIREARM
Filed March 22, 1940　　　12 Sheets-Sheet 1
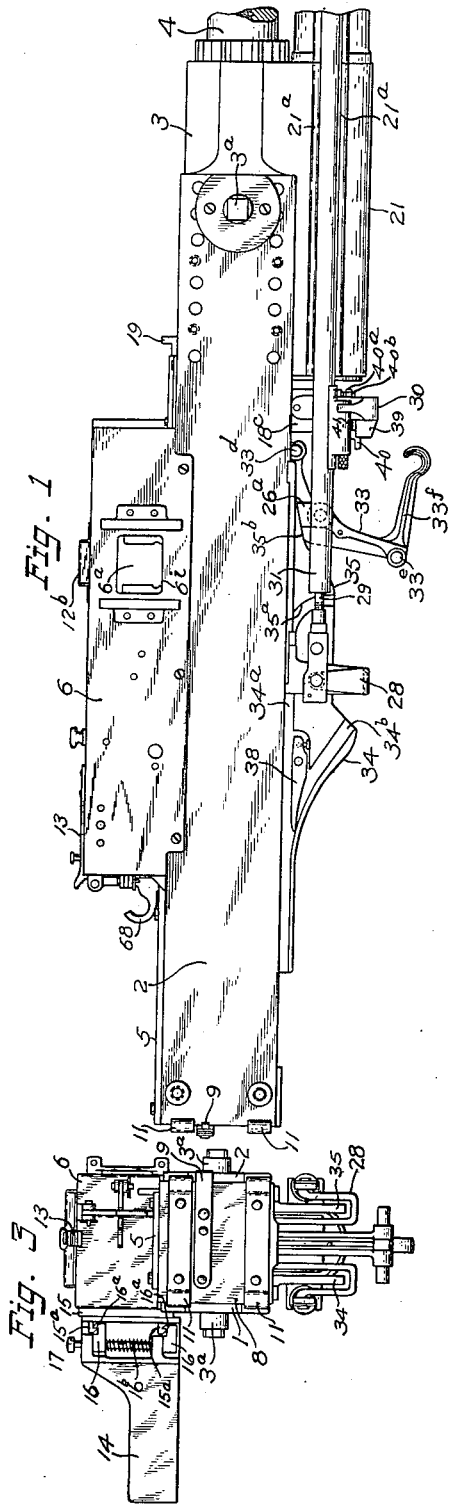
Inventor
George Webb
By S. Jay Teller
Attorney

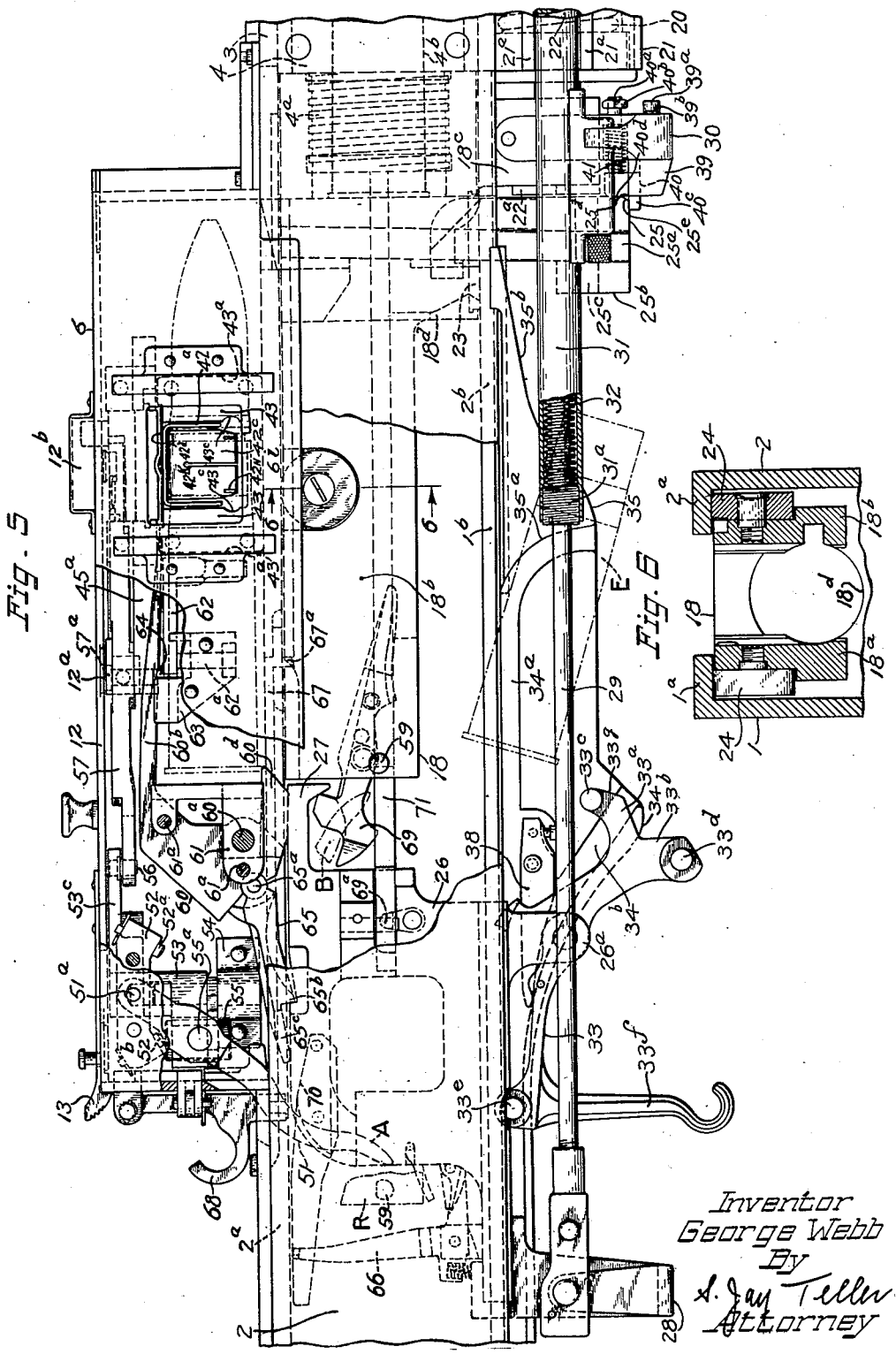

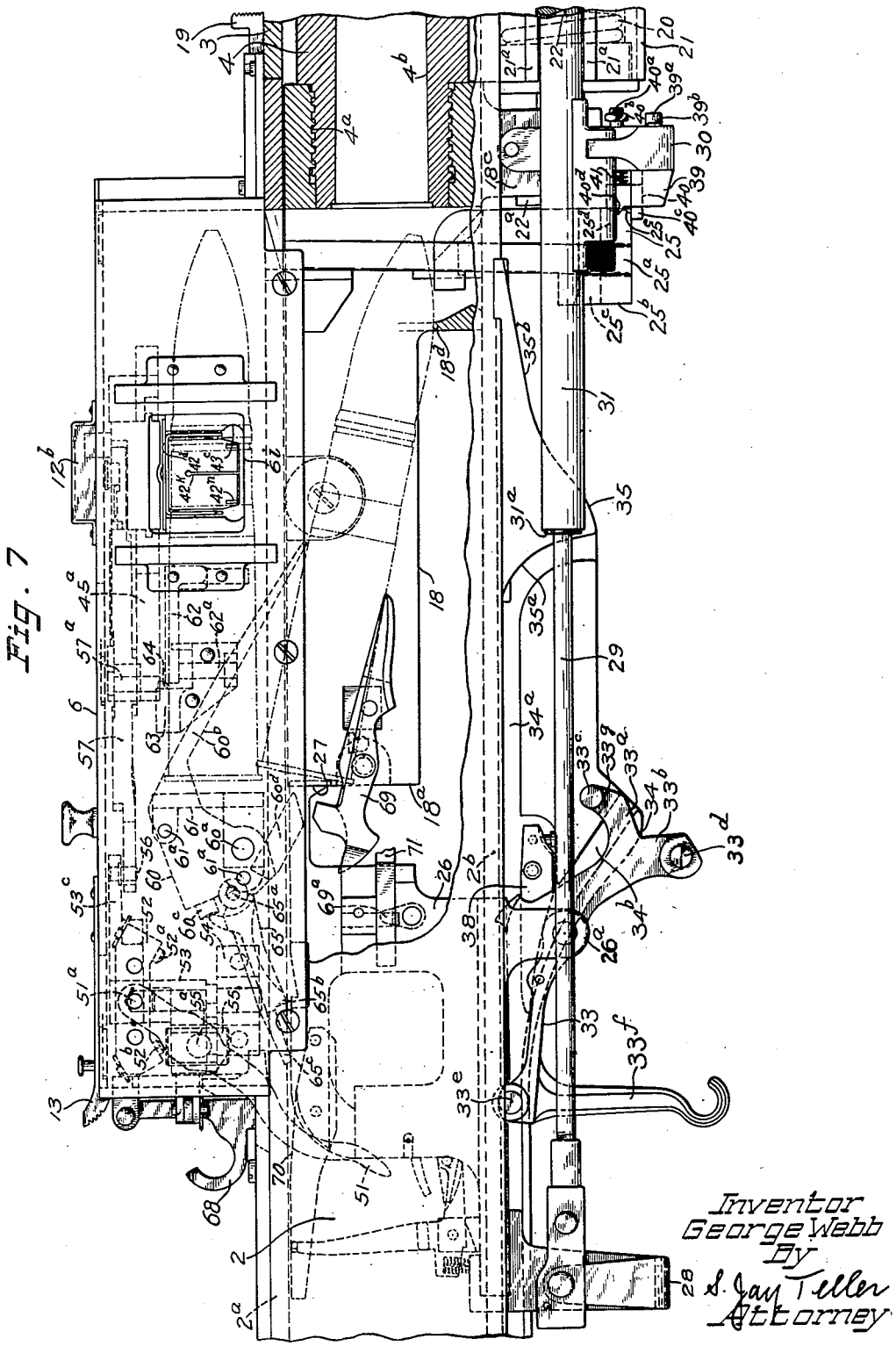

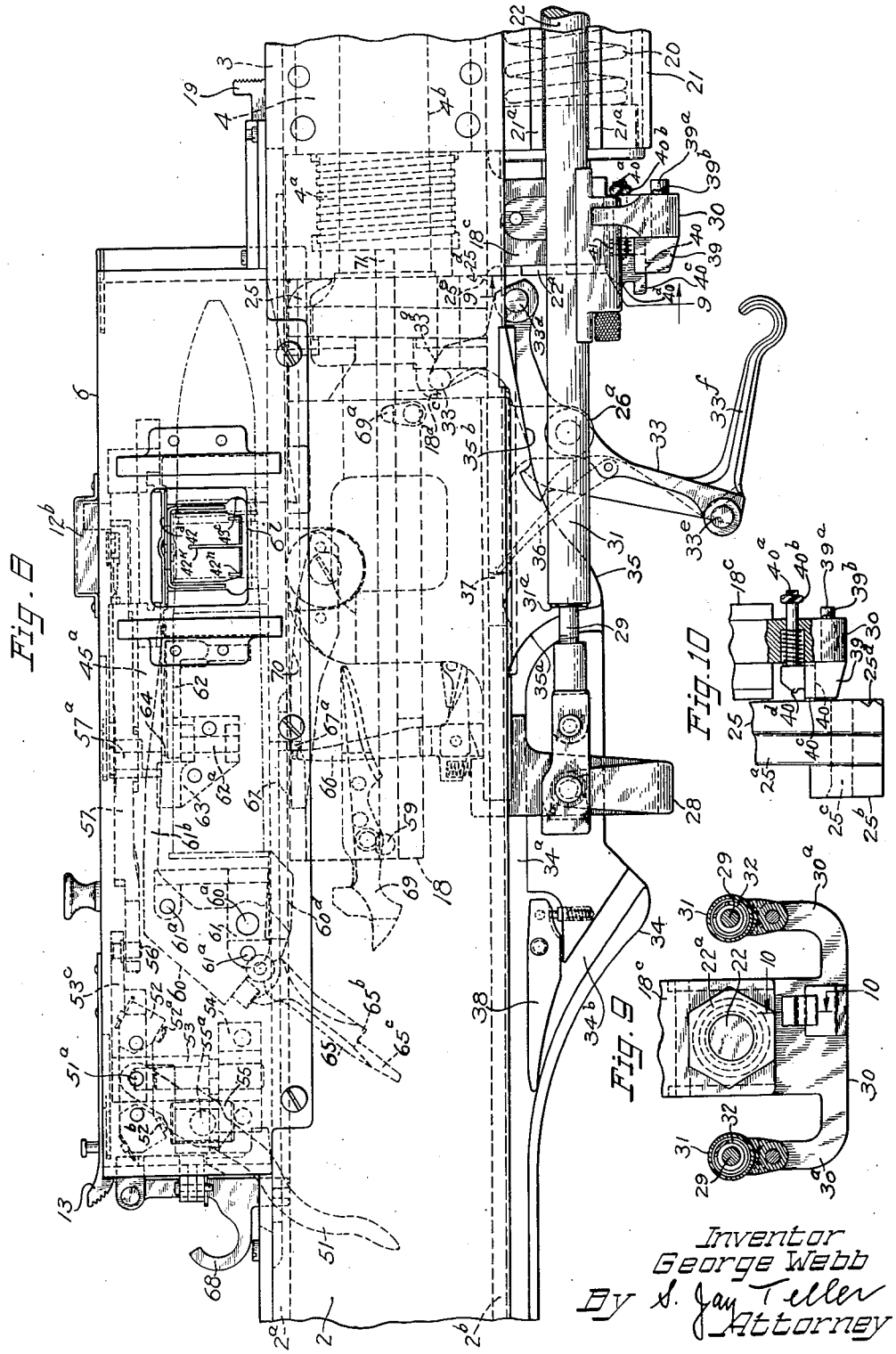

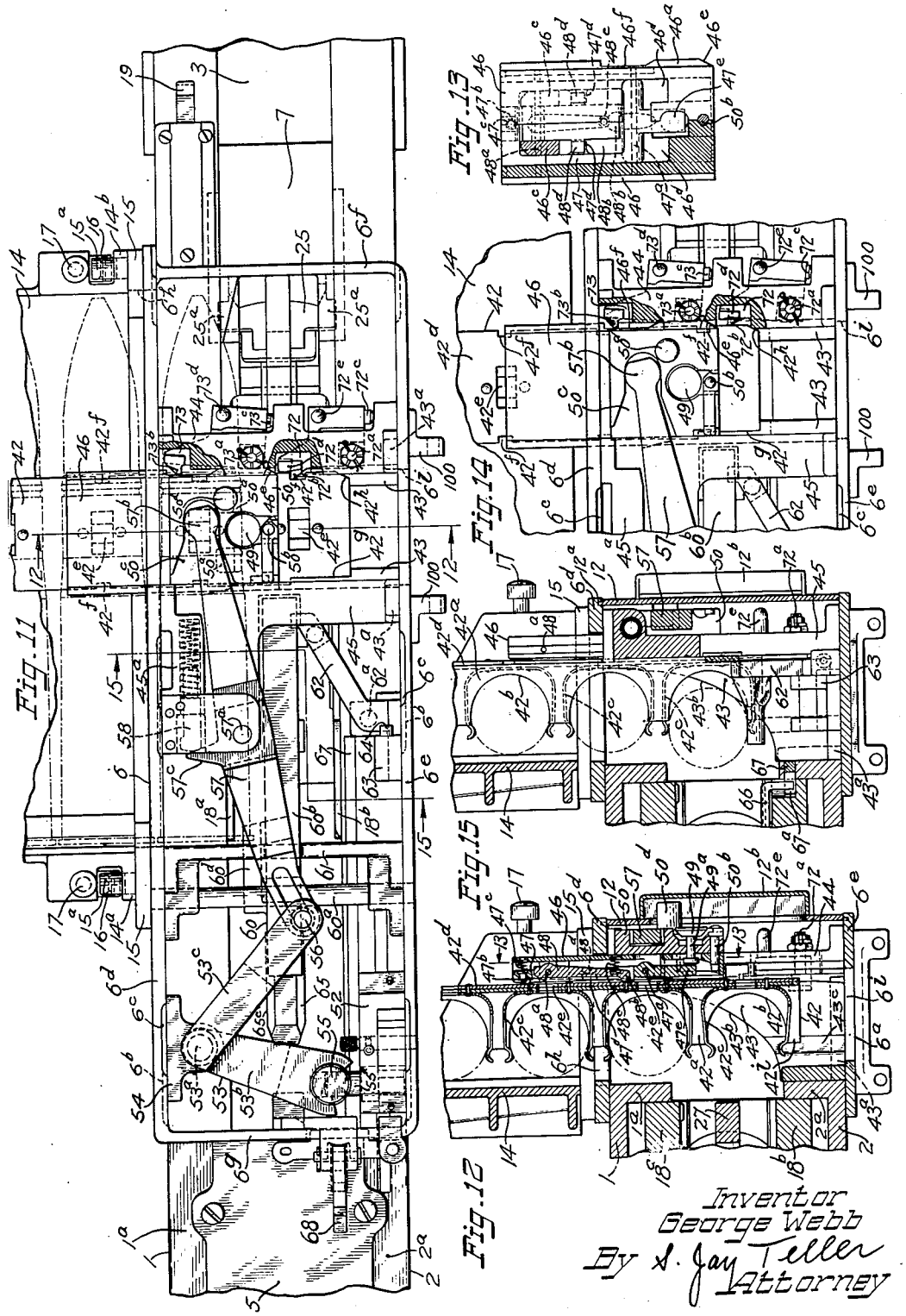

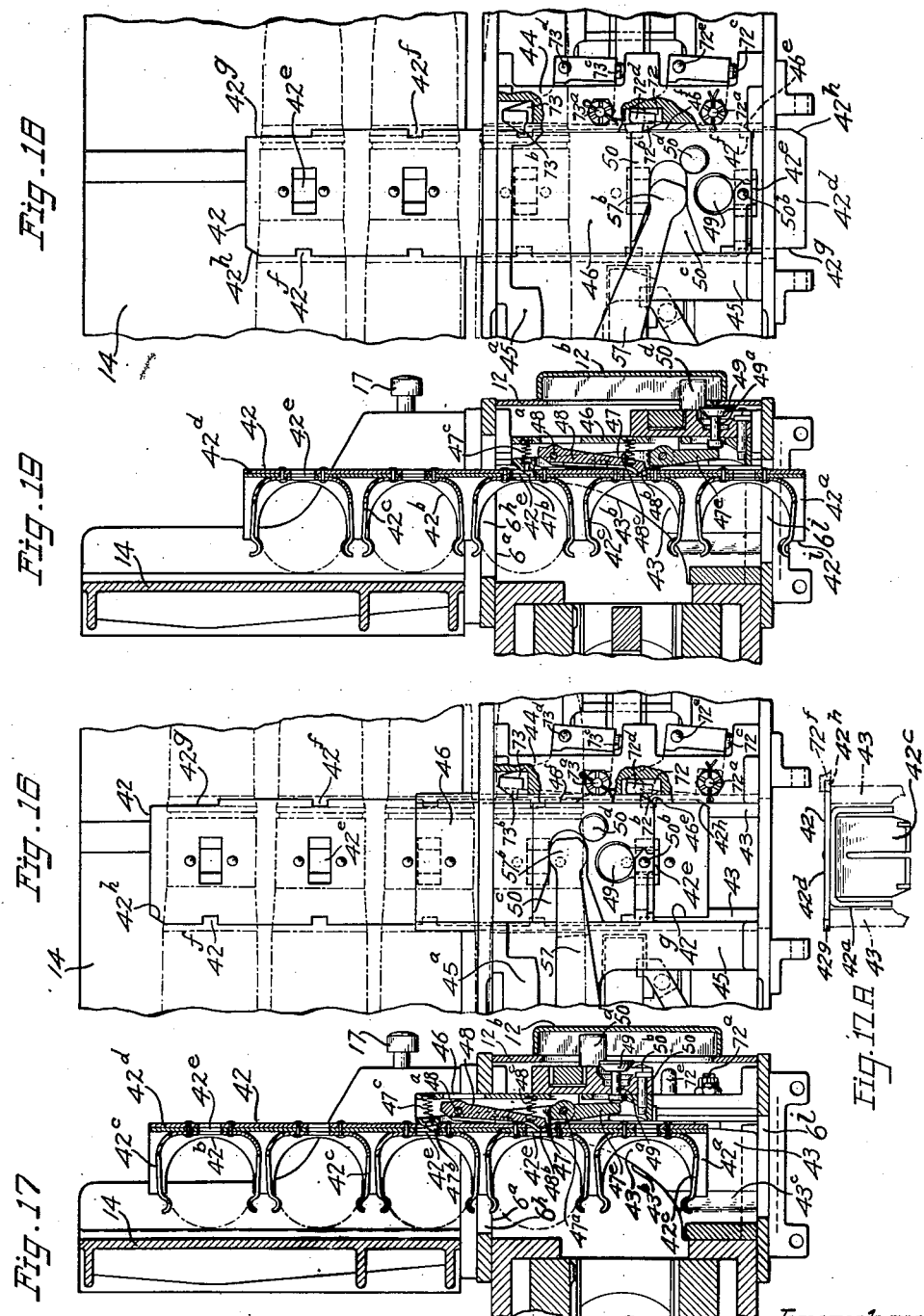

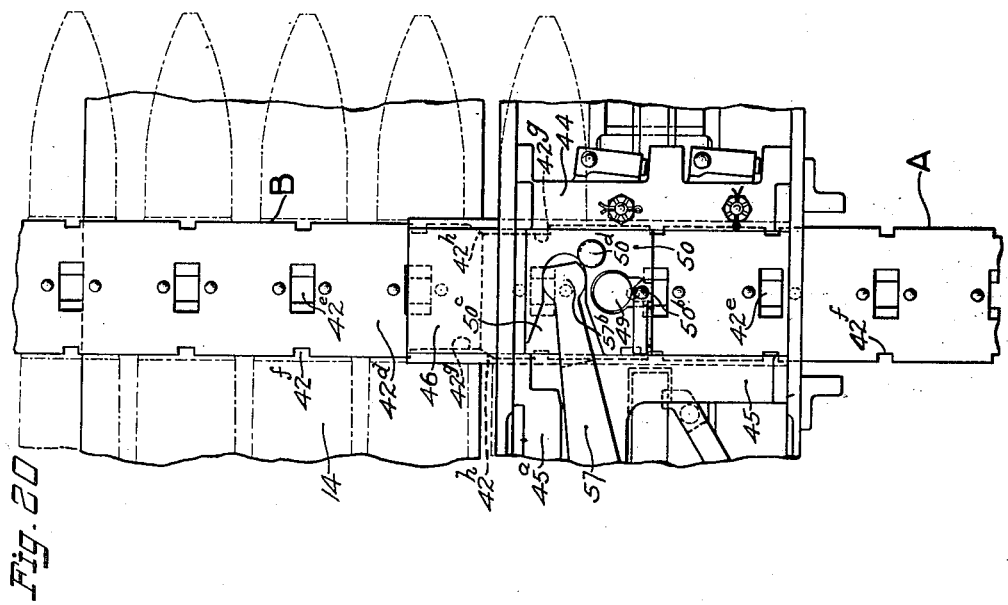
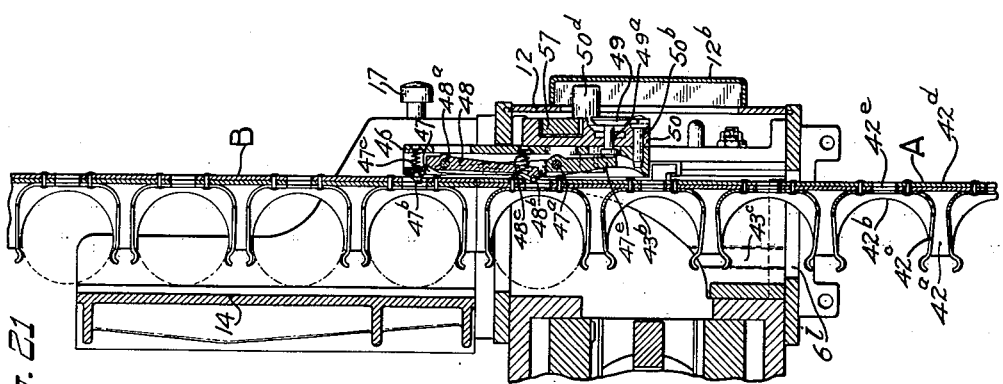

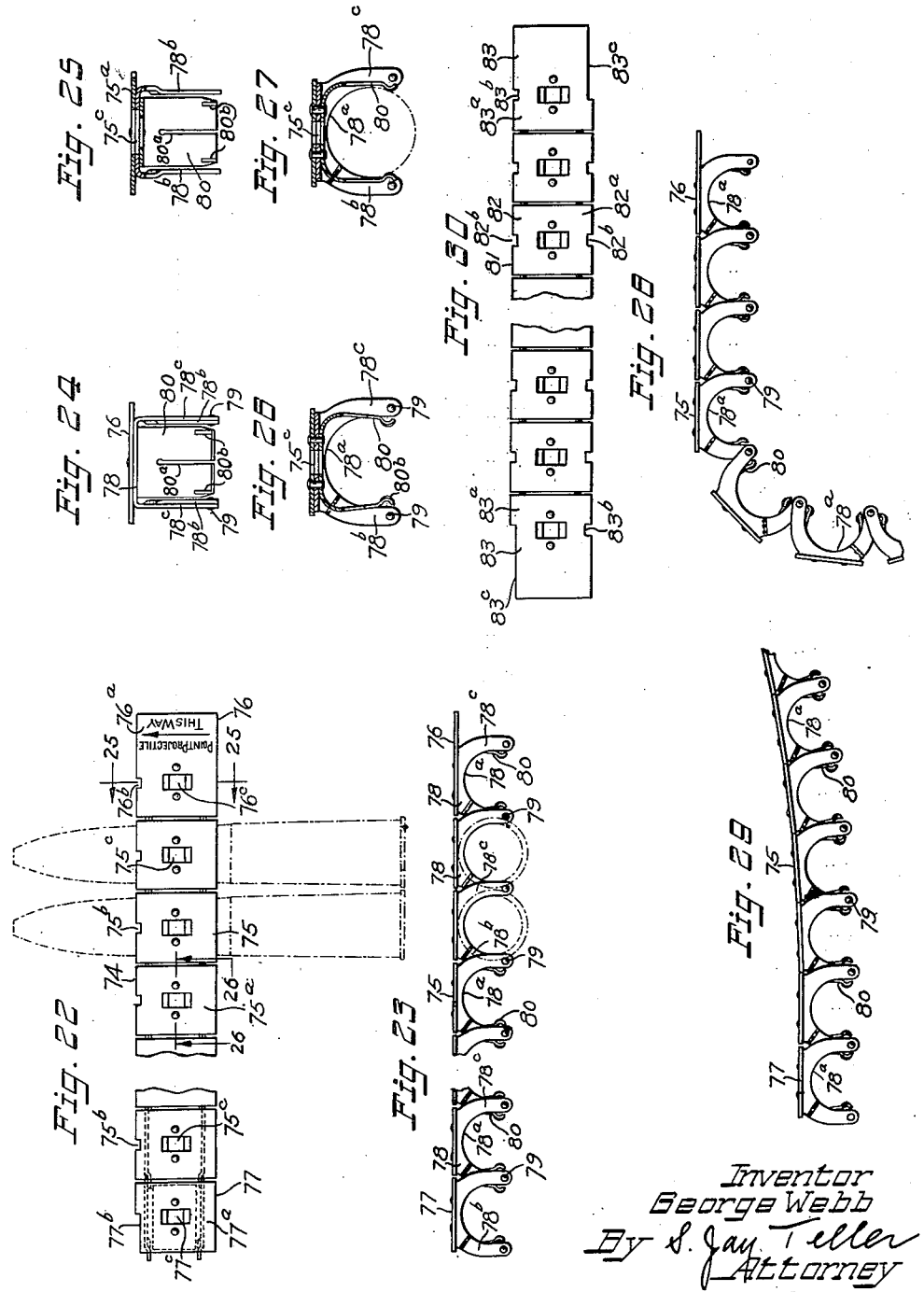

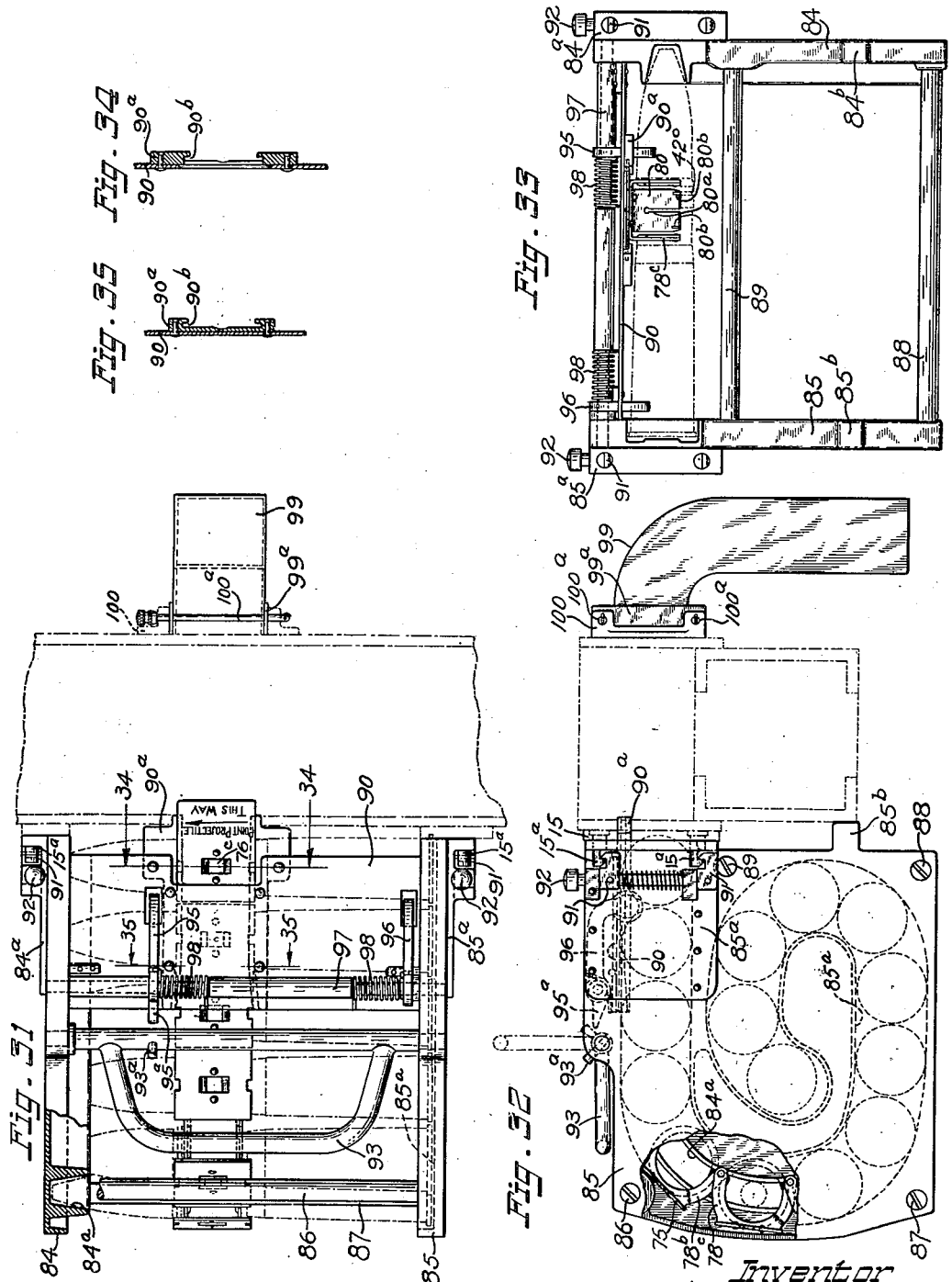

May 8, 1945. G. WEBB 2,375,452
AUTOMATIC FIREARM
Filed March 22, 1940 12 Sheets-Sheet 10
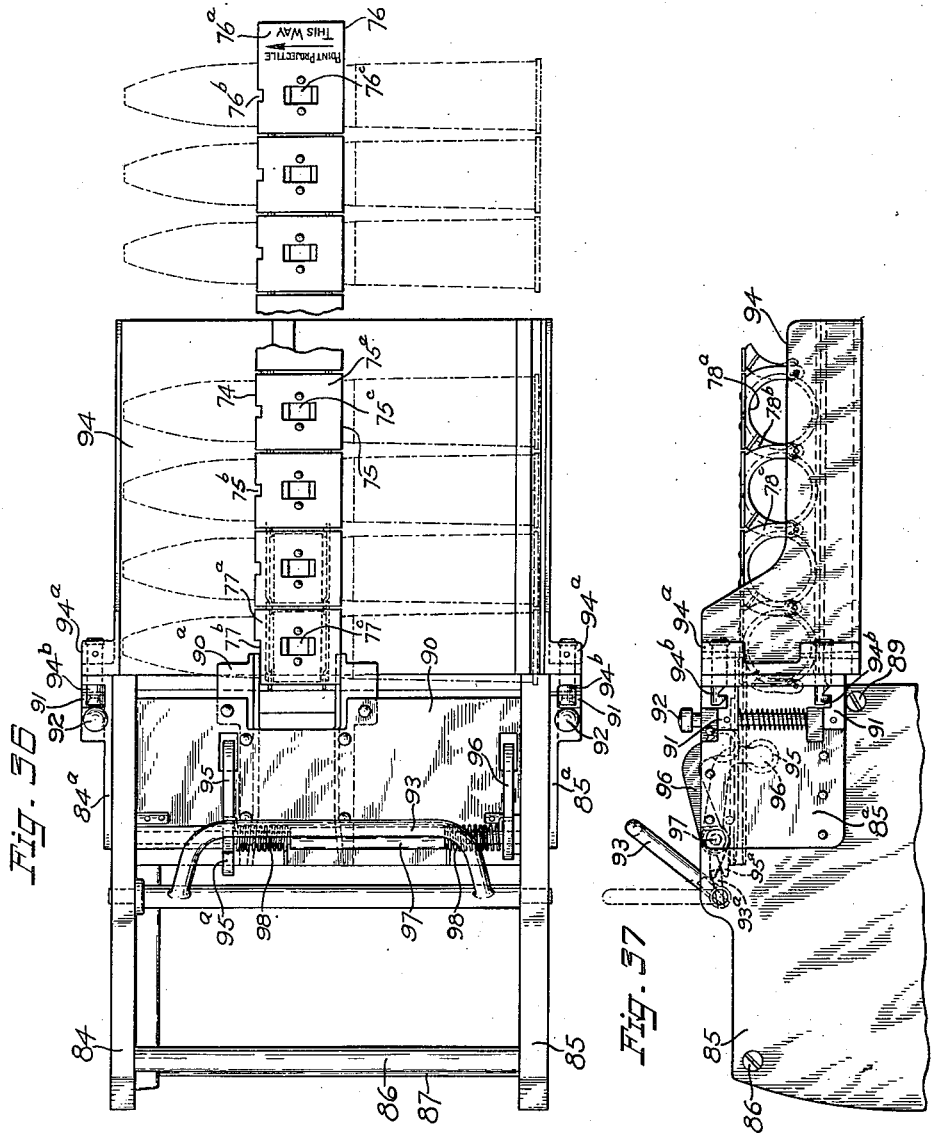
Inventor
George Webb
By S. Jay Teller
Attorney

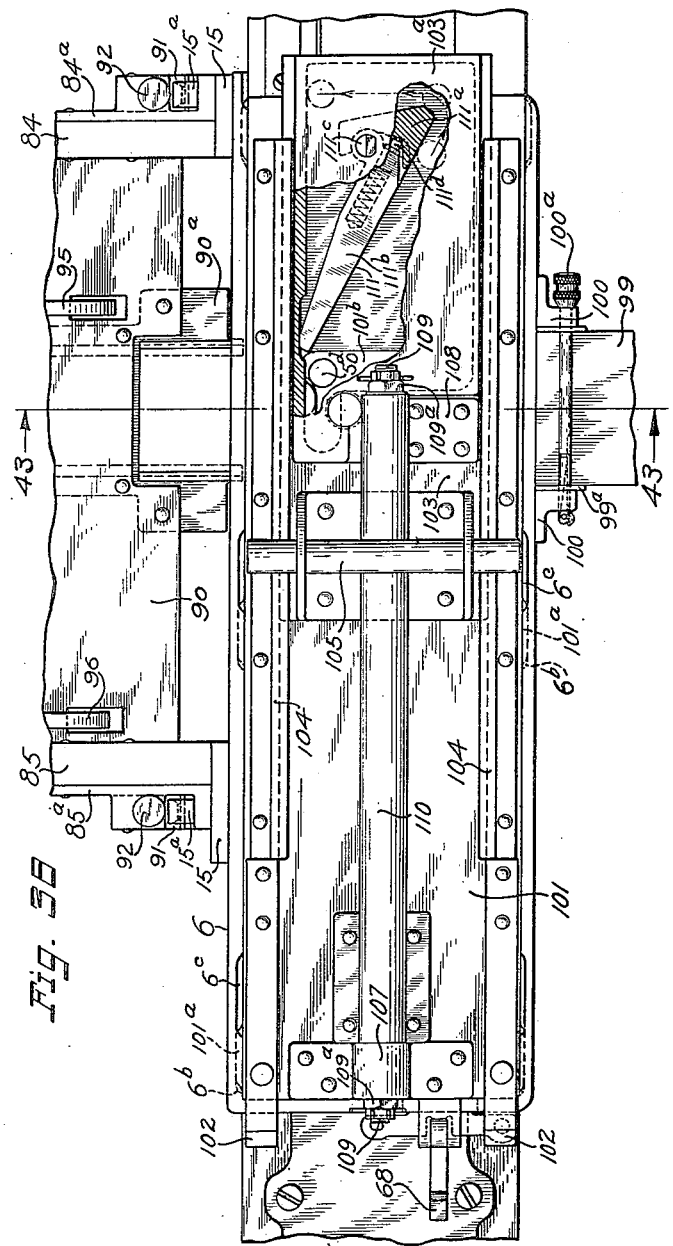

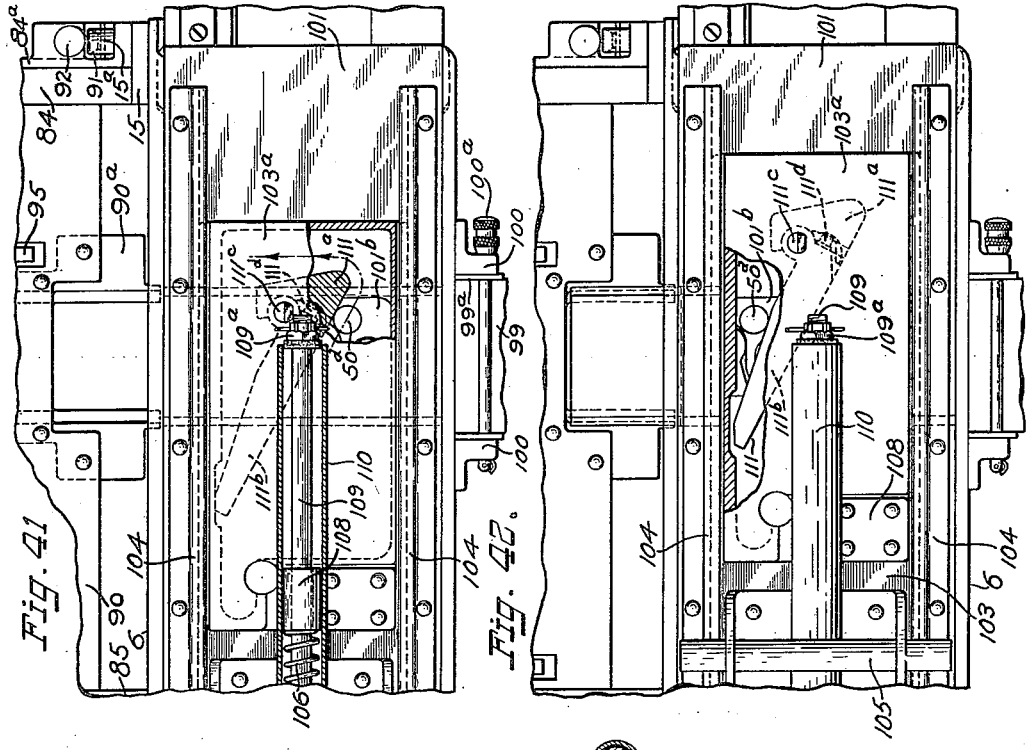
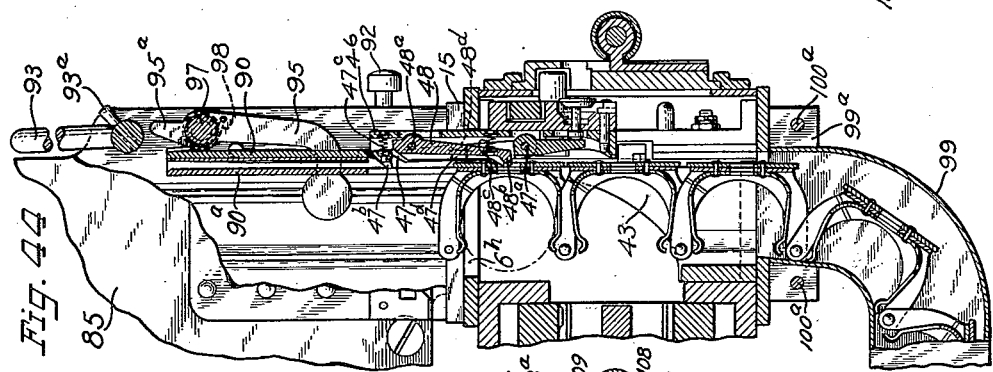
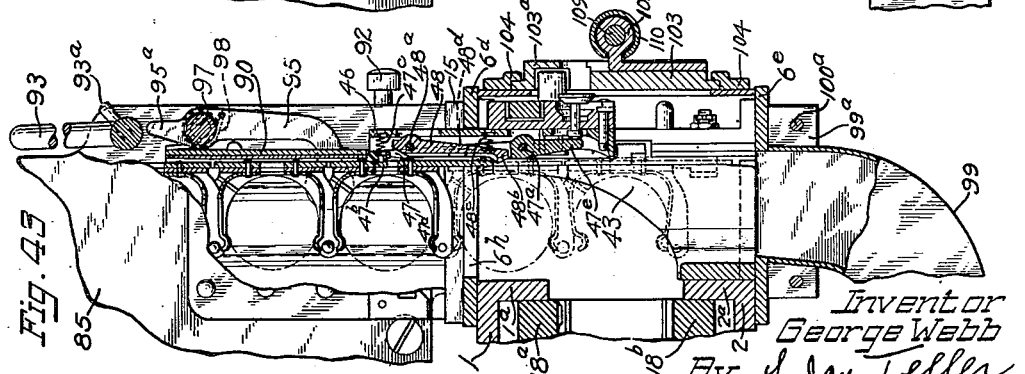

Patented May 8, 1945

2,375,452

UNITED STATES PATENT OFFICE 2,375,452

AUTOMATIC FIREARM

George Webb, Hartford, Conn., assignor to Colt's Patent Fire Arms Manufacturing Company, Hartford, Conn., a corporation of Connecticut Application March 22, 1940, Serial No. 325,405

13 Claims. (Cl. 89—33)

While not necessarily so limited, the invention is particularly applicable to an automatic firearm embodying some or all of the inventions disclosed in the foregoing prior patents and applications for patents: J. M. Browning, 1,525,065, February 3, 1925; J. M. Browning, 1,525,066, February 3, 1925; J. M. Browning, 1,525,067, February 3, 1925; J. M. Browning, 1,692,328, November 20, 1928; C. Pfeiffer, 1,692,277, November 20, 1928; F. T. Moore and C. Pfeiffer, 1,852,057, April 5, 1932; F. T. Moore, Serial No. 305,240, filed November 20, 1939, and G. Webb, Serial No. 314,271 filed January 17, 1940, now Patent No. 2,297,640.

The invention relates in part to certain improved mechanical features of the breech casing and breech mechanism. Among these features are means preventing possible spreading of the breech casing side plates at the rear, means for minimizing friction and wear in conjunction with reciprocation of the barrel extension, and means for releasably retaining the vertically movable breech block.

An automatic firearm of the type referred to has a cartridge supporting device such as a loading tray or magazine which is connected with the feed box of the firearm but is readily separable therefrom. In accordance with the invention I provide improved means for separably connecting the supporting device with the feed box.

The invention relates in part to the construction of the feed slide and associated parts, and in accordance with the invention I provide a novel construction whereby the feed slide is operatively connected with the feed mechanism, this construction having great strength and rigidity, serving to facilitate assembly and disassembly, and being otherwise advantageous as will presently appear.

With a firearm of the type here involved, there is a feeder which holds a plurality of spaced cartridges, the feeder with its cartridges being herein called a cartridge feeder assembly. In accordance with the invention the reciprocating feed slide of the firearm is provided with two feeding teeth each adapted to move the feeder assembly, these teeth being spaced apart by a distance equal to the spacing between the cartridges. Thus the two teeth can act in unison or successively to effect the movement of one feeder assembly or they can act in unison to move two successive feeder assemblies.

The cartridge feeder assembly may be initially pushed manually into the feed channel and it is thereafter fed intermittently by the reciprocating feed slide. Difficulty has heretofore been experienced on account of overfeeding, which is particularly likely to occur when the feeder assembly is first manually inserted into the feed channel of the firearm but which may also occur when the feeder assembly is subsequently advanced by the feed slide. Such overfeeding may result in jamming or mal-functioning of the firearm, and one of the objects of the present invention is to provide means for preventing overfeeding without in any way interfering with normal feeding. The feeder may be provided with notches for use in preventing overfeeding, and when such notches are provided they may be utilized for engagement by a retainer to prevent substantial retrograde movement of the feeder.

The invention relates not only to those parts of the firearm which cooperate with the cartridge-holding feeder but also to the feeder itself which has certain novel and important details of construction. The feeder may be straight and rigid or it may be flexible.

One phase of the invention involves particularly the alternate flexible or articulated-link cartridge feeder and a magazine for holding it. The articulated-link feeder and the magazine are adapted to be used in lieu of the rigid feeder without any major changes in the firearm, and they are so constructed as to cooperate in a novel manner with certain portions of the firearm.

The loading tray for the rigid cartridge feeder assembly and the magazine for the flexible cartridge feeder assembly are interchangeably connectible with the firearm, the same connection devices on the firearm being used for both. A loading plate is provided in association with the magazine to facilitate inserting a cartridge feeder assembly into the magazine, and this has connection devices like those on the gun so that it may be readily connected with the magazine. The invention relates in part to the loading tray, the magazine, the magazine loading plate and to the connection devices for them.

The invention relates not only to the magazine and the articulated-link feeder in combination with the firearm, but also to the said magazine and articulated-link feeder separately.

While not absolutely essential, it is preferable to provide the firearm with means for operating the feed slide manually separately from the breech mechanism. One phase of the invention involves a suitable mechanism for so operating the feed slide.

The invention relates further to various other details of construction and combinations of parts, as will be more fully apparent from the following specification.

In the accompanying drawings I have shown in detail one embodiment of the invention and also certain variations thereof which have been found to be satisfactory. It will be understood, however, that without departing from the spirit of the invention there may be various changes in the construction and that the drawings are not to be construed as defining or limiting the scope of the invention, the claims forming a part of this specification being relied upon for that purpose.

Of the drawings:

Fig. 1 is a side view of an automatic firearm embodying the invention, the forward portions of the barrel and recuperator being broken away.

Fig. 2 is a plan view.

Fig. 3 is a rear view.

Fig. 4 is a fragmentary bottom view of the rear portion of the firearm.

Fig. 5 is a fragmentary side view on an enlarged scale, portions of the right hand side plate and portions of the right hand wall of the feed box being broken away to show interior parts. In this view the various parts are in the positions which they normally assume at the conclusion of firing.

Fig. 6 is a fragmentary transverse vertical sectional view taken along the line 6—6 of Fig. 5.

Fig. 7 is a view similar to Fig. 5, but showing the parts in intermediate positions through which they pass during the feeding of a cartridge into the chamber of the barrel. In this view, portions of the right hand side plate are broken away and portions of the barrel and barrel extension and associated parts are shown in longitudinal central section.

Fig. 8 is a view similar to Figs. 5 and 7, but showing the parts in the positions which they occupy with the cartridge fully inserted in the chamber and ready for firing.

Fig. 9 is a fragmentary rear view of the depending portion of the barrel extension and also of the breech bolt retaining stop taken on line 9—9 of Fig. 8.

Fig. 10 is a fragmentary longitudinal vertical sectional view taken along the line 10—10 of Fig. 9.

Fig. 11 is a fragmentary plan view with the feed box cover omitted, the parts being in the same position as in Fig. 8. The cartridge feeder is shown in the position to which it is ordinarily moved manually.

Fig. 12 is a fragmentary vertical sectional view taken along the line 12—12 of Fig. 11.

Fig. 13 is a detailed view showing the feed slide, this view being partly in plan and partly in horizontal section along the line 13—13 of Fig. 12.

Fig. 14 is a fragmentary plan view similiar to Fig. 11 but showing the cartridge feeder in an intermediate position.

Fig. 15 is a fragmentary vertical sectional view taken along the line 15—15 of Fig. 11, but showing the cartridge feeder in the same position as in Fig. 14.

Fig. 16 is a fragmentary plan view similar to Fig. 11, but showing the feed slide partly advanced in the feeding direction.

Fig. 17 is a view similar to Fig. 12, but with the parts in the positions corresponding to Fig. 16.

Fig. 17A is a front end view of the feeder with certain immediately associated parts shown in dot-and-dash lines.

Fig. 18 is a view similar to Fig. 16, but showing the feed slide advanced to its extreme limit of feeding movement.

Fig. 19 is a view similar to Fig. 17, but showing the parts in the positions corresponding to Fig. 18.

Fig. 20 is a view similar to Fig. 16, but showing the feed slide returned to its initial position. This view also shows two feeders.

Fig. 21 is a view similar to Fig. 17, but showing the parts in the positions corresponding to Fig. 20 and also showing two feeders.

Fig. 22 is a plan view of an articulated-link feeder adapted to be used in a magazine. This view is on a scale larger than that of Figs. 1 to 4 but smaller than that of Figs. 5 to 21.

Fig. 23 is a side view of the feeder shown in Fig. 22.

Fig. 24 is an end view of the feeder shown in Fig. 22.

Fig. 25 is a transverse vertical sectional view taken along the line 25—25 of Fig. 22.

Fig. 26 is a fragmentary longitudinal vertical sectional view taken along the line 26—26 of Fig. 22.

Fig. 27 is a view similar to Fig. 26, but showing the adjustment of the spring clip to accommodate a cartridge.

Fig. 28 is a view similar to Fig. 23, but showing the normal flexing of the feeder to conform to the requirements of a magazine.

Fig. 29 is a view similar to Fig. 23, but showing the possible reverse flexing of the feeder.

Fig. 30 is a view similar to Fig. 22, but showing an alternative feeder construction which may be used to provide end-to-end reversibility.

Fig. 31 is a plan view showing a magazine and a discharge chute adapted to use the articulated-link feeder shown in Figs. 22 to 30. In this view the firearm is indicated by dot-and-dash lines.

Fig. 32 is a rear view of the magazine and discharge chute shown in Fig. 31.

Fig. 33 is a view showing the right side of the magazine as it appears when separated from the gun. Only the first cartridge and the front end of the feeder are shown in this view.

Fig. 34 is a fragmentary vertical sectional view taken along the line 34—34 of Fig. 31.

Fig. 35 is a fragmentary vertical sectional view taken along the line 35—35 of Fig. 31.

Fig. 36 is a plan view showing a loading plate associated with the magazine and also showing the relative position of the articulated-link feeder at the beginning of loading.

Fig. 37 is a fragmentary rear view of the parts shown in Fig. 36.

Fig. 38 is a fragmentary plan view, with a certain portion broken away, of a manually operable feed mechanism adapted to be used in conjunction with the articulated-link feeder and the magazine shown in Figs. 22 to 37. This view is on the same scale as Figs. 5 to 21.

Fig. 39 is a fragmentary rear view of the manually operable feed mechanism shown in Fig. 38.

Fig. 40 is a fragmentary view, partly in elevation and partly in central longitudinal section, of the parts shown in Fig. 38.

Fig. 41 is a fragmentary plan view similar to Fig. 38, but showing the parts in different relative positions.

Fig. 42 is another fragmentary plan view similar to Fig. 38 but showing the parts in still different relative positions.

Fig. 43 is a fragmentary vertical transverse sectional view taken along the line 43—43 of Fig. 38. This view shows the articulated-link feeder in the position which it first occupies prior to being moved by the feed slide.

Fig. 44 is a view similar to Fig. 43, but showing the articulated-link feeder in the position which it occupies just prior to the feeding of the last cartridge.

The firearm or gun shown in the drawings is similar generally to the firearms disclosed in the before-mentioned patents and applications for patents. For details not herein fully disclosed reference may be had to the said patents and applications and more particularly to the Browning Patent No. 1,525,065.

The gun is well adapted for use in airplanes, although its use is not so limited. In the drawings, particularly Figs. 1 to 4, the gun is shown in its horizontal position which may be regarded as "normal." However, the gun may be used at various angles of elevation or depression or even inverted or it may be turned laterally. The terms "horizontal" and "vertical" as herein used are to be understood as relative terms which are applicable when the firearm is in its normal position as shown. The term "transverse" as used herein and in the claims defines a direction which is substantially at a right angle to the longitudinal axis of the gun, unless otherwise specified.

The breech casing of the gun comprises two spaced side plates 1 and 2, connected at the front with a trunnion block 3, having trunnions 3a, 3a. Connected with trunnion block 3, but longitudinally slidable therein as will presently appear, is a barrel 4. The side plates 1 and 2 are provided respectively with inturned top and bottom flanges, the top flanges 1a and 2a being shown in Fig. 2. The top of the casing is closed at the rear by a top plate 5, it is closed from the front end of said top plate to a point some distance in rear of the rear end of the trunnion block 3 by a feed box 6, and it is closed between the front end of the feed box and the trunnion block by small plate 7.

At the rear the casing is closed by a vertically slidable rear or back plate 8 having vertical tongues 8a, 8a at its edges which enter and fit vertical grooves in the side plates 1 and 2, as shown in Fig. 4. The back plate 8 is inserted from the bottom and is normally held in place by a spring latch 9 which enters a notch in the rear end of the side plate 2.

Carried by the back plate 8 is a buffer 10 adapted to limit the rearward movement of a member of the breech mechanism as will be hereinafter explained. The details of the buffer do not form any part of the present invention and they are not here shown. During normal functioning of the gun, the buffer and the back plate may receive very heavy blows from the said member of the breech mechanism and these repeated blows may tend to separate the side plates 1 and 2. It is obvious that if the side plates were to separate, the back plate 8 would be less securely held. To avoid any possible separation of the side plates, the back plate 8 is preferably provided with two straps 11, 11 which are formed at their ends with hook or abutment portions 11a, 11a that engage the outer faces of the side plates to prevent any possible separation.

The feed box 6 contains members of the cartridge feeding mechanism and is provided with a transverse channel 6a into which the cartridges and the feed plate or feeder carrying the same may be fed from left to right. To permit access to the parts of the feed mechanism, the feed box 6 is provided with a movable top cover 12. The cover 12 is preferably entirely removable, and as shown it has projecting longitudinal tongues 12a, 12a at its opposite edges which fit corresponding longitudinal grooves 6b, 6b in the side walls of the feed box, which grooves are shown in Fig. 11. Openings at 6c, 6c permit the cover to be moved vertically downward to bring the tongues into register with the grooves. The cover is then moved rearward to enter the tongues in the grooves, and a spring latch 13 on the cover serves to hold it in place.

Detachably connected with the feed box 6 is a cartridge supporting device which is shown in Figs. 1 and 3 as being a shelf-like loading tray 14. As will be hereinafter made clear, a magazine may be substituted for the loading tray. When the tray 14 is used it serves to support the cartridge feeders and cartridges preparatory to their insertion into the feed channel 6a and into engagement with the feed mechanism. The tray 14 and the feed box 6 are provided respectively with connection devices which serve to connect them, but which permit them to be readily disconnected and separated. Similar connection devices are used to secure the hereinafter described magazine to the feed box and also to secure a hereinafter described magazine loading plate to the magazine. All of said connection devices comprise the subject matter of a divisional application, Serial No. 437,854, filed April 6, 1942. The connection devices may be varied as to details and as to relative arrangement of parts, but as shown the tray 14 is provided with vertical walls 14a and 14b which are normally immediately adjacent the outer face of a bracket 15 on the left wall of the feed box, and the said walls are apertured to receive two pairs of studs 15a, 15a projecting from the said bracket 15. The studs 15a, 15a are notched at their bottoms and the tray 14 is provided with two spring-pressed latches 16, 16 each having two teeth 16a, 16a adapted to enter the notches in the studs to hold the tray in place. The two teeth are mounted on a vertical rod 16b which is pressed upward by the spring. The latches 16, 16 are provided with buttons 17, 17 by means of which they can be pushed downward to permit disconnection and separation of the parts.

Reference will now be had particularly to Figs. 5 to 11 of the drawings. As already stated, the barrel 4 is longitudinally slidable in an opening in the trunnion block 3. The barrel is detachably connected with a barrel extension 18 which is longitudinally movable in the casing, being guided at the top by the inward projecting flanges 1a and 2a on the side plates 1 and 2, and being guided at the bottom by other similar flanges 1b and 2b.

The barrel extension comprises a forward body portion with which the barrel is connected and it also comprises two rearward extending arms 18a, 18b which are spaced apart transversely, as shown in Fig. 11. The barrel is connected with the barrel extension by means of threads at 4a and the barrel is locked in its threaded engagement with the barrel extension by means of a suitable latch which is not shown, the said latch being controlled by a slidable fingerpiece 19 on the breech casing. The latch for the barrel and the latch controlling means are not herein shown in detail as they do not of themselves constitute any part of the present invention. They are disclosed and claimed in my beforementioned co-pending application Serial No. 314,271.

The barrel and barrel extension move rearward upon recoil and are returned in the forward direction by a recuperator spring 20 enclosed in a recuperator tube 21 secured to the bottom of the trunnion block 3. The spring 20 acts through a recuperator rod 22 which is connected at its rear end with a depending lug 18ᶜ on the barrel extension 18. A nut 22ᵃ threaded on the rod serves to effect connection with the lug 18ᶜ.

The barrel extension 18 is provided at its bottom with suitable wear plates 23 which engage the bottom flanges 1ᵇ and 2ᵇ. In order to reduce resistance and avoid wear, the two arms 18ᵃ, 18ᵇ of the barrel extension are preferably provided at their tops with rollers 24, 24 mounted on suitable bearing studs, as shown particularly in Fig. 6. These rollers engage and roll along the bottom faces of the top flanges 1ᵃ and 2ᵃ and thus serve to guide the barrel extension during its reciprocating movement.

Carried by the barrel extension 18 is a breech block 25 which is arranged to slide substantially vertically between the arms 18ᵃ and 18ᵇ. The block is guided in its vertical movement by means of ribs 25ᵃ which fit corresponding grooves in the arms of the barrel extension as shown in Fig. 11. Figs. 5 and 7 show the breech block in its lowermost position and Fig. 8 shows the breech block in its uppermost breech-closing position. The lower portion of the breech block 25 has a rearward projection 25ᵇ and in the thus longitudinally widened lower portion of the breech block there is provided a T-slot 25ᶜ which receives the actuating lever for raising and lowering the breech block as will be presently explained.

Longitudinally movable within the breech casing is a lock frame 26. The inner edges of the lower flanges 1ᵇ, 2ᵇ of the casing side plates enter longitudinal slots in the edges of the lock frame, the frame being thus guided. The upper portion of the lock frame is of such width as to permit it to move between the arms of the barrel extension. Carried by the upper portion of the lock frame is a charger 27.

Depending from the lock frame 26 is a yoke 28 to which are detachably connected two transversely spaced tension rods 29, 29. The depending lug 18ᶜ of the barrel extension 18 carries a yoke 30 having lateral projecting arms 30ᵃ, 30ᵃ as shown particularly in Fig. 9. Detachably supported in part on the arms 30ᵃ, 30ᵃ are tubes 31, 31, these tubes being also supported in part by longitudinal flanges 21ᵃ, 21ᵃ on the recuperator tube 21. The tubes 31, 31 receive the tension rods 29, 29 and also receive reaction springs surrounding the tension rods. One of these springs 32 is shown in Fig. 5. The springs 32 abut at their rear ends against plugs 31ᵃ in the rear ends of the tubes 31, and abut at their forward ends against collars (not shown) on the rods 29, 29 near the forward ends thereof. The arrangement of and connections for the reaction springs and associated parts, are shown in detail in the before-mentioned Moore and Pfeiffer Patent No. 1,852,057.

The cycle of movements will be later described in greater detail, but for the present it is sufficient to point out that upon recoil the barrel, barrel extension and lock frame move rearward substantially simultaneously from the positions shown in Fig. 8. The lock frame is held, at least momentarily, in the position shown in Fig. 5; but the barrel and barrel extension immediately move forward under the influence of the recuperator spring 20, as already stated, and the tubes 31, 31 move forward at the same time, thus compressing the springs 32 and tensioning the rods 29, 29. Upon subsequent release of the lock frame, the springs 32 cooperate with the rods 29, 29 to move the lock frame forward to the position indicated in Fig. 8.

Pivotally mounted between downward projecting lugs 26ᵃ on the lock frame, is a breech block actuating lever 33. The lever 33 has its forward arm ending in two diverging branches 33ᵃ and 33ᵇ, the upper arm 33ᵃ having short lateral studs 33ᶜ adapted to enter the wide portion of the T-slot 25ᶜ in the breech block and the lower branch having long lateral studs 33ᵈ adapted to cooperate with certain cam surfaces formed on cam plates 34 and 35 secured respectively to the bottoms of the left and right side plates 1 and 2 of the breech casing. The rear arm of the lever 33 is also provided with long lateral studs 33ᵉ adapted to cooperate with other cam surfaces on the said cam plates 34 and 35. The actuating lever 33 also has a depending arm 33ᶠ with a hook or handle portion on the lower end. This portion of the actuating lever can be used for manually moving the lever and also the lock frame.

When the lock frame moves forward from the position shown in Fig. 5, the left-hand stud 33ᵉ travels along a cam groove 34ᵃ in the left cam plate 34. The actuating lever is so controlled by the cam groove 34ᵃ that the studs 33ᶜ enter the T-slot 25ᶜ in the breech block 25. Shortly thereafter the studs 33ᵉ engage the cam surface 35ᵃ on the right cam plate 35 and also a similar surface on the left cam plate 34. This causes the actuating lever to rotate in the counter-clockwise direction thus moving the breech block 25 upward. Counter-clockwise movement of the actuating lever is continued by means of a strut 36 which abuts against a spring-pressed plunger 37 carried by the lock frame. When the parts reach the relative positions shown in Fig. 8, a surface at 33ᵍ on the actuating lever engages the breech block in such a manner as to positively lock it in its upper breech-closing position.

As already stated the barrel extension, and the lock frame with their connected parts move rearward in unison upon recoil. During this rearward movement the studs 33ᵈ of the actuating lever move along the cam surface 35ᵇ on the cam plate 35 and a similar surface on the cam plate 34, thus turning the actuating lever in the clockwise direction and moving the breech block downward. As rearward movement continues, the left stud 33ᵉ on the actuating lever enters the cam groove 34ᵇ in the plate 34 and the counter-clockwise movement of the actuating lever is thus continued. The stud 33ᵉ is carried past the spring-pressed switch 38 which yields to allow the stud to enter the rear part of the cam groove 34ᵃ. The switch then returns to its normal position as shown so that upon forward movement the stud will follow the cam groove 34ᵃ. The described clockwise movement of the operating lever carries the breech block downward to its lowermost position as shown in Fig. 5. Forward movement of the barrel extension occurs prior to the forward movement of the lock frame, and this causes the complete separation of the breech block from the actuating lever as shown in Fig. 5.

As already stated, Fig. 7 shows the breech block in its lowermost normal position. Downward movement of the breech block is normally limited by a movable stop which is in some respects similar to that disclosed in my before-mentioned copending application Serial No. 314,271. The construction here shown differs, however, from that shown in the application and has certain advantages.

Carried by the before-mentioned yoke 30 which is secured to the depending lug 18° of the barrel extension, is a rearward projecting ledge 39 which is at one side of the central plane of the gun. The ledge 39 is shown as being a separate member having a stem 39ª which projects forward through a hole in the yoke. A cotter pin 39ᵇ extends through the stem to hold it in place. Supported on the ledge 39 and slidable thereon is a stop member 40 provided with a stem 40ª which projects forward through a hole in the yoke. A spring 41 biases the stop member toward its rearward position and a nut or collar 40ᵇ on the stem 40ª limits rearward movement. The stop member 40 is provided at the rear with a stop portion 40ᶜ and with a detent portion 40ᵈ. The stop portion 40ᶜ is adapted to engage the bottom of the breech block to limit downward movement thereof and the detent portion 40ᵈ is adapted to enter a V-shaped notch 25ᵈ in the front face of the breech block, near the bottom thereof and at one side of the T-slot 25ᶜ. Immediately below the notch 25ᵈ the breech block is beveled as shown at 25ᵉ.

As the breech block moves downward to its lowermost position as shown in Fig. 5, the beveled surface at 25ᵉ causes the stop member 40 to momentarily move forward to a limited extent but not far enough to permit release of the breech bolt. The said stop member immediately returns in the rearward direction to enter the detent 40ᵈ in the notch 25ᵈ simultaneously with the engagement of the bottom of the breech block with the stop portion 40ᶜ. It will be observed that the detent 40ᵈ thus serves to resist any movement of the breech block out of its lowermost position without, however, preventing the normal upward movement of the breech block when it is again engaged by the actuating lever 33. During operation, the gun is not always in the horizontal position as shown and it may be in an inclined position or even in an inverted position. The detent 40ᵈ serves under all possible conditions of use to hold the breech block in the relative position shown in Fig. 5 until it is positively moved out of that position by the operating lever 33.

When it is desired to remove the breech block from the gun for inspection, cleaning or replacement, this can be readily done by manually moving the stop member 40 forward to the position shown in Fig. 10. The breech block moves downward by gravity as shown in the same figure. When the breech block is to be replaced, it is pressed against the stop member 40 so as to force it forward and then the breech block can be pushed upward into its normal lowermost position, the stop member being pushed rearward by the spring 41 to snap under the block and retain it in that position.

Reference will now be had particularly to Figs. 11 to 15 and also to Figs. 5, 7 and 8. The before-mentioned feed box 6 is preferably rectangular in form, having side walls 6ᵈ and 6ᵉ and front and rear walls 6ᶠ and 6ᵍ. The side walls 6ᵈ and 6ᵉ have depending portions which fit against and are secured to the corresponding side plates 1 and 2 of the main casing. The feed box is normally closed at the top by the cover 12 which has already been described. Openings 6ʰ and 6ⁱ are provided respectively in the side walls 6ᵈ and 6ᵉ of the feed box to provide an entrance to and an exit from the before-mentioned transverse feed channel 6ª. The opening 6ʰ at the left side is of such size as to receive not only the feeder but also the cartridges, while the opening 6ⁱ at the right side need only be large enough to permit the exit of the feeder.

A cartridge feeder of one type is designated as 42 and is clearly shown in Figs. 16, 17 and 17A, this being a rigid feeder adapted to hold a small number of cartridges, as for instance five. I do not limit myself to a rigid feeder and may use an articulated-link feeder as hereinafter described. The rigid and articulated-link feeders illustrated and described hereinafter comprise the subject matter of a divisional application, Serial No. 437,853, filed April 6, 1942.

The main body portion 42ª of the feeder is formed of sheet metal and bent to the shape of an inverted U, as shown in Fig. 17A. The depending side flanges of the feeder body are provided with spaced notches or recesses 42ᵇ to receive the cartridges. In the case of a rigid feeder the body portion 42ª is a single piece of metal. The cartridges are held in place by means of spring clips 42ᶜ, 42ᶜ as shown in Fig. 17. Riveted or otherwise secured to the top of the U-shaped member 42ª is a plate 42ᵈ which constitutes a guide structure for the feeder. The plate 42ᵈ is preferably of such width that the depending flanges of the body portion are spaced inward from its edges whereby the outer edges of the plate, in effect, constitute oppositely directed guide flanges. In the case of a rigid feeder the plate or guide structure 42ᵈ, like the body portion 42ª, is a single piece of metal. The two members 42ª and 42ᵈ are transversely slotted at 42ᵉ, 42ᵉ for engagement with the feed pawls to be described. There may be variation in detail as to the formation of the slots 42ᵉ, 42ᵉ, and the term feed slots will be used to generically designate the spaced portions of the feeder which are adapted to be engaged by the feed pawls.

The feed slots 42ᵉ, 42ᵉ have the same spacing as the cartridges. When two feeders are placed in end-to-end contact the spacing between the end slots 42ᵉ, 42ᵉ of the two feeders is approximately the same, but preferably it is a little greater. This small added length at the ends of the feeder makes it possible to provide more metal in the body flanges at the ends thereof adjacent the end notches or recesses 42ᵇ as shown at 42ⁱ in Fig. 19. Without this added length the metal at 42ⁱ would be narrow and weak.

The top plate or guide structure 42ᵈ of the feeder is notched at least at one side as shown at 42ᶠ, 42ᶠ and 42ᵍ, the notches having the same spacing as the cartridges and as the feeding slots 42ᵉ, 42ᵉ. The outer or trailing notch 42ᵍ is open at the outer or trailing end as shown. At the inner or leading end there is a bevel 42ʰ. Preferably the feeder is reversible so that either end may be foremost, and when so made the notches 42ᶠ, 42ᶠ and 42ᵍ and also the bevel 42ʰ are provided at both sides. The functions of the notches and bevels will be hereinafter set forth.

The U-shaped spring clips 42ᶜ, 42ᶜ are preferably each provided in their respective legs with a bifurcation or slot 42ᵏ such as illustrated in Figs. 5, 7 and 8. This, in effect, provides each leg of the clip with a pair of independently movable resilient fingers 42ᵐ. Each spring finger has an inward extending detent 42ⁿ formed therein adjacent the outer end of the finger and near the outer edge of each. The projectile portion or member of each cartridge is provided with an annular groove 42°. When the cartridge is mounted in the feeder between the fingers 42ᵐ and within the confines of the notches 42ᵇ of the side flanges, the cartridge is so placed longitudinally thereof with respect to the feeder that the forwardmost pair of oppositely disposed detents 42ⁿ engage the annular groove 42° of the cartridge to prevent movement of the cartridge with respect to the feeder in a direction longitudinal of the cartridge. It will be seen that the other pair of detents 42ⁿ which are not received in the cartridge groove will frictionally engage the outer surface of the cartridge to assist the first-mentioned pair of detents and their spring fingers in releasably retaining the cartridge within the feeder. Proper frictional engagement between the respective detents 42ⁿ of each clip and the cartridge will be asured in view of the mounting of each detent on an independently movable resilient finger 42ᵐ.

In practice the cartridges are placed in the feeder prior to intended use. For convenience of description a loaded feeder with its cartridges will be referred to as a "feeder assembly." In using the firearm, a feeder assembly is placed on the loading tray 14 and pushed into the feed channel 6ª of the feed box.

For supporting and guiding the feeder and the cartridges as they enter and pass through the feed channel, there are provided two parallel guide plates or members 43, 43 which are provided with flanges 43ª, 43ª by which they are secured to the right hand side of the feed box 6, as shown in Fig. 5. These feeder guide members are so positioned that the body portion 42ª of the feeder with its parallel depending side flanges fits between them, thus enabling the guide structure 42ᵈ of the feeder to rest upon the guide members as shown in Fig. 5, and also in Fig. 17A. The feeder assembly is thus supported and accurately guided. The guide members 43, 43 have downward facing cam surfaces 43ᵇ which engage the cartridges to force or strip them downward out of engagement with the clips 42ᶜ when the feeder assembly is moved to carry each successive cartridge to or near a central position in the gun. Preferably the guide members 43, 43 have grooves 43ᶜ, 43ᶜ to provide clearance for the heads of the pivot pins or rivets of the articulated-link feeder hereinafter described.

Two separate feed slide guide members 44 and 45 extend transversely between the side walls of the feed box adjacent the openings 6ʰ and 6ⁱ and near the top of the box. Transversely movable in suitable grooves in the guide members is a feed slide 46. Referring particularly to Fig. 13 it will be observed that the feed slide 46 has longitudinal tongues 46ª and 46ᵇ for fitting the grooves in the guide members 44 and 45.

Carried by the feed slide 46 is a feed tooth adapted to successively engage the feeder assembly to effect feeding, and preferably there are two such teeth spaced apart in the direction of slide reciprocation by a distance approximately equal to the distance between two cartridges. The two teeth will engage the feeder assembly at the same time and they have other important advantages which will be hereinafter explained.

When the feeder has feed slots such as 42ᵉ, 42ᵉ the teeth engage these slots. The slide is so constructed and positioned that at the beginning of each feeding movement as shown in Figs. 11 and 12 and in Figs. 20 and 21, the outer tooth 47ᵇ is considerably outside the feed box and the inner tooth 48ᵇ is inside the feed box.

As shown, particularly in Figs. 12 and 13, the two feed teeth on the slide 46 are formed as parts of two separate pawls 47 and 48 pivotally connected with the feed slide. In the feed slide 46 is a large central recess open at the bottom and partly closed at the top. The pawl 47 is generally rectangular in shape and is positioned in the recess in the slide, being mounted on a pivot pin 47ª. At the outer end of the pawl is a tooth 47ᵇ adapted to successively enter the slots 42ᵉ, 42ᵉ in the feeder. Depending from the top wall of the feed slide are two bosses 46ᶜ, 46ᶜ, these being within a large rectangular opening in the pawl 47. The second feed pawl 48 is pivotally connected at 48ª with the bosses 46ᶜ, 46ᶜ, and at its inner end is a tooth 48ᵇ adapted to successively enter the feed slots 42ᵉ, 42ᵉ of the feeder. It will be seen that the two pawls extend in opposite directions from their respective pivots and that they overlap each other. Separate springs 47ᶜ and 48ᶜ bias the respective pawls 47 and 48 to cause the teeth 47ᵇ and 48ᵇ to enter the said slots 42ᵉ, 42ᵉ.

A manually operable means is provided for simultaneously withdrawing both of the teeth 47ᵇ and 48ᵇ from engagement with the feed slots of the feeder in order to permit the feeder to be withdrawn from the feed channel in the retrograde direction. When there are two separate feed pawls they are moved simultaneously. As shown, the pawl 48 has two lateral projections 48ᵈ, 48ᵈ which overlie projections 47ᵈ, 47ᵈ on the pawl 47. The pawl 47 has a tail portion 47ᵉ by means of which it may be moved to withdraw the tooth 47ᵇ from the feeder, and when it is so moved the aforesaid projections move the pawl 48 to simultaneously withdraw the tooth 48ᵇ. A button 49 is carried on the slide 46, this button having a stem 49ª which engages the tail portion 47ᵉ of the pawl 47. Manual pressure on the button 49 will move both of the pawls 47 and 48 to withdraw the teeth 47ᵇ and 48ᵇ from the feeder.

Carried by the feed slide 46 is an actuating block 50 having depending lugs 50ª, 50ª, as shown in Fig. 11, which enter and fit notches 46ᵈ, 46ᵈ in the slide. A removable pin 50ᵇ in the block normally enters a hole in the slide to hold the block in place as shown in Fig. 12. During assembly the slide is first put in place in the guides 44 and 45, and thereafter the block 50 is secured to the slide. The block 50 when connected with the slide serves to hold the slide in place, the block engaging the side walls 6ᵈ and 6ᵉ of the feed box to prevent removal of the slide. The block 50 provides a substantial body of metal for engagement by the feed lever to be described, and it has an open-sided notch 50ᶜ for receiving the lever. The before-mentioned button 49 for withdrawing the pawls is preferably carried by the block 50.

The block 50 preferably has an upward extending pin 50ᵈ by means of which the block and slide can be moved independently of the breech mechanism as hereinafter explained in detail. When the pin 50ᵈ is provided the cover 12 has an opening to provide clearance for the pin, there being an enclosing housing 12ᵇ over the opening.

For operating the feed slide in timed relationship with the functioning of the firearm, there is provided a feed lever 51 which is horizontally pivoted at 51ª on a bracket 52 secured to the right side wall of the feed box. The bracket 52 is provided with spring-pressed plungers 52ª and 52ᵇ which serve to cushion the movement of the lever near the ends of its path of oscillation. A bell crank lever 53 is pivoted at 53ª for movement about a vertical axis, the said lever being carried by a bracket 54 secured to the walls of the feed box. The arm 53ᵇ of the lever 53 which extends toward the right is provided with a notch which receives a vertical cylindrical head 55 on a stud 55ª pivoted on the feed lever 51. The arm 53ᶜ of the bell crank lever 53 which extends forward is provided with a depending stud 56 which enters a slot at the rear end of a connecting lever 57. This lever 57 is movable about a vertical axis at 57ª, being carried by a rearward extension 45ª of the transverse guide member 45. At the forward end of the lever 57 is a partly cylindrical head 57ᵇ which enters a partly cylindrical portion of the notch 50ᶜ in the block 50 on the feed slide 46.

The extension 45ª on the guide 45 carries a spring-pressed plunger 58 which engages a lug 57ᶜ on the lever 57. By means of this plunger the lever 57 and the slide 46 and all of the movable parts connected with them are biased to the relative positions shown in Fig. 11, the feed lever 51 being in the position A shown by full lines in Fig. 5.

For operating the feed lever 51 a stud 59 is provided at the right or outer side of the right arm 18ª of the barrel extension. When the barrel extension moves to its rearmost position upon recoil, approximately as shown in dot-and-dash lines at R in Fig. 5, the stud 59 is in a position behind the feed lever 51, the said lever having been momentarily pushed upward in opposition to the spring-pressed plunger 52ᵇ and having been returned by the plunger to the position shown. As the barrel and barrel extension move forward to the position shown by full lines in Fig. 5, the feed lever is moved forward from the position A shown in Fig. 5 to the position B shown by dot-and-dash lines in the same figure. When the feed lever is moved forward as described, the bell crank 53 is moved in the counter-clockwise direction and the connecting lever 57 is moved in the clockwise direction, thus moving the feed slide toward the right, that is in the cartridge feeding direction. The slide is moved from the position shown in Fig. 11, through the position shown in Fig. 16 and to the position shown in Fig. 18. If a feeder such as 42 is in place, the pawls 47 and 48 on the slide engage slots 42ᵉ, 42ᵉ in the feeder, thus advancing the feeder through a distance equal to that between two cartridges. As soon as the stud 59 moves forward far enough to disengage the feed lever 51, the feed slide and its associated parts are immediately returned to the positions shown in Fig. 11, this being effected by the biasing action of the plunger 58 as already described. While the feed slide and associated parts are ordinarily returned by the biasing means, it should be observed that the feed lever 51 would in any event be moved rearward by the stud 59 upon the next recoil movement of the barrel extension.

A carrier 60 is mounted on a pin 60ª for pivotal movement about a horizontal axis. The pivot pin is carried by a bracket 61 extending across the feed box and secured by rivets at 61ª, 61ª.

The main body 60ᵇ of the carrier 60 is located centrally between the side walls of the feed box and it is normally above the foremost cartridge being fed into the gun. The carrier is normally held in its upper position, as shown in Figs. 5 and 11, by means of a carrier catch 62 carried by a bracket 63 and connected for pivotal movement about a vertical axis at 62ª. A spring-pressed plunger 64 tends to hold the carrier catch in its operative position as shown in Fig. 11.

A dog 65 is connected with the rear portion of the carrier 60 for relative pivotal movement about a horizontal axis at 65ª. A spring-pressed plunger 60ᶜ serves to bias the carrier and the dog for movement in opposite directions, the carrier being biased in the clockwise direction and the dog being biased in the counter-clockwise direction. The dog 65 has a tooth 65ᵇ which is adapted to enter a notch in the charger 27 as shown in Fig. 5. The dog thus serves to hold the charger and the lock frame in the position shown notwithstanding the tendency of the reaction springs 32 to move them forward. The dog 65 has a tail portion 65ᶜ which rests on the top of the charger.

Carried by the lock frame is a firing mechanism which need not be described in detail as it is similar to that in the Browning Patent 1,575,065. For present purposes it is sufficient to point out that this mechanism includes a trigger lever 66 adapted to effect firing when moved rearward with respect to the lock frame. Slidably mounted in a groove in the flange 2ª of the right side plate of the casing is a trigger bar 67 shown in Figs. 8 and 15, this bar having a depending lug 67ª adapted to engage the trigger lever 66 when the parts are in forward positions as shown in Fig. 8. The trigger bar can be moved rearward by a trigger 68 at the rear of the feed box, and when so moved the trigger bar 67 and the trigger lever 66 are moved rearward to effect firing. If the trigger bar is held in its rearward position, firing occurs automatically as soon as the parts reach the positions shown in Fig. 8.

As shown in Fig. 7, a pivoted ejector 69 is carried by the left arm 18ª of the barrel extension, at the inner side thereof. This ejector is oscillated about its pivotal axis by a stud 69ª carried by the lock frame 26 at the left side thereof.

Prior to initial loading of the gun, the various parts of the gun (but not the feeder assembly) may be assumed to be in the relative positions shown in Figs. 5 and 11. The ejector 69 is in its lower position as shown in Fig. 5. The feeder assembly, that is the feeder with cartridges therein, is placed on the loading tray 14 and then pushed manually into the feed channel being guided by the guide members 43, 43. When the feeder reaches approximately the intermediate position shown in Figs. 14 and 15, the first cartridge has been nearly withdrawn from its clip 42ᶜ by the cam surfaces 43ᵇ, 43ᵇ and the said first cartridge has been brought into engagement with the carrier catch 62. A very small additional movement beyond the position shown in Figs. 14 and 15 completely releases the cartridge from the clip and at the same time moves the catch 62 sufficiently to release the carrier 60. Thereupon the carrier moves downward to the position shown in Fig. 7 under the influence of the spring plunger 60ᶜ, this movement causing the cartridge to move to the position shown in the same figure. The cartridge in this intermediate position is partly supported at the rear by the ejector 69 and is supported at the front by the transverse connecting portion 18ᵈ of the barrel extension.

The clockwise movement of the carrier 60 about its axis at 60ᵃ moves the axis at 65ᵃ upward. The upward movement of the forward end of the dog 65 causes the tail 65ᶜ thereof to withdraw the tooth 65ᵇ from the notch in the charger, thus releasing the charger and the lock frame and permitting them to move forward under the influence of the reaction springs. The charger 27 thereupon engages the rear end of the cartridge and pushes the cartridge forward into the chamber 4ᵇ of the barrel as shown in Fig. 8.

Movement of the carrier 60 to the position shown in Fig. 7 brings a lug 60ᵈ thereon into the path of a cam 70 carried by the charger 27. As already stated the charger and lock frame and associated parts immediately start to move forward upon the downward movement of the carrier. During such movement the cam 70 engages the lug 60ᵈ and restores the carrier to its initial position where it is engaged and held by the catch 62. As the lock frame moves forward, the stud 69ᵃ engages the ejector 69 to move it in the counter-clockwise direction from the position shown in Fig. 7 to the position shown in Fig. 8.

As soon as the cartridge is fully entered in the chamber 4ᵇ, the breech block 25 is moved upward behind the cartridge in the manner already described so as to close the breech. If the trigger 68 is not being held firing does not occur; but if the trigger is subsequently pulled the trigger lever 66 is moved rearward and firing takes place. Thereupon the barrel, barrel extension and lock frame move rearward in unison. During rearward movement, the breech block 25 is lowered and the empty shell is extracted by an extractor 71 carried by the lock frame as shown in Fig. 5. Unless the feed lever 51 has already been moved rearward by the biasing plunger 58, it is so moved by the stud 59 on the barrel extension. The charger and lock frame move rearward against the buffer 10 and upon again starting forward are momentarily held in the position shown in Fig. 5 by the dog 65, but the barrel and barrel extension immediately move forward. As the barrel extension moves forward, the ejector 69 moves to a position over the empty shell and the stud 69ᵃ on the lock frame turns the ejector in the clockwise direction to the position shown in Fig. 5, thus causing the front end of the ejector to engage the empty shell and release it from the extractor 71. The empty shell then moves downward between the bottom flanges 1ᵇ and 2ᵇ on the side plates, as shown at E.

The said forward movement of the barrel extension also causes the feeding of another cartridge in the manner already fully described. If the trigger is held in its rearward position, the described movements continue automatically in rapid succession until all of the cartridges in the feeder have been fired. After the firing of the last cartridge, the parts (other than the feeder) are retained in the position shown in Fig. 5.

As already explained, the feeding of the first cartridge is effected manually by pushing the feeder 42 with the cartridges therein into the feed channel of the gun. The feeder must be pushed to a position just beyond that shown in Figs. 14 and 15. While it is necessary to advance the feeder far enough to release the first cartridge and permit it to be pushed into the chamber of the barrel, it is highly important that means be provided for preventing the feeder from being advanced too far. Without a suitable means for preventing it, the operator through carelessness or inadvertence might push the feeder so far as to release a second cartridge before the firing of the first thus causing a serious jamming of the gun. One means for preventing manual overfeeding is disclosed in the before-mentioned application in the name of F. T. Moore, Serial No. 305,240. In accordance with the present invention, I have utilized some of the features disclosed in the said Moore application but I have provided a construction which is different in many details and which has numerous important advantages.

In accordance with the present invention a stop is provided which is normally operative to limit the movement of the feeder assembly in the feeding direction, particularly the initial manual movement thereof, and in association with the stop there is provided means for automatically moving the stop out of its operative position upon feeding movement of the slide so as to permit the slide to move the feeder assembly. Preferably and as shown the stop engages directly with the feeder itself, although this may not be essential.

As shown, particularly in Figs. 11 to 19 the feeder stop is a pawl 72 which is pivotally mounted at 72ᵃ on the guide member 44, this pawl having a tooth 72ᵇ which is adapted to engage the feeder. The pawl 72 is so positioned that its bottom face is immediately adjacent the top face of the front guide member 43, as shown in Fig. 17A. The pawl carries a spring-pressed plunger 72ᶜ which biases it in the feeder-engaging direction. When the feeder is first advanced through the feed channel, the pawl 72 is cammed out of the way by the bevel 42ʰ at the forward or leading end of the feeder and the tooth 72ᵇ enters the first notch 42ᶠ thus positively preventing the operator from moving the feeder beyond the position shown in Figs. 11 and 12. By referring particularly to Fig. 12 it will be observed that the feeder has been advanced beyond the position shown in Fig. 15, the first cartridge having been released from the feeder and the slots 42ᵉ, 42ᵉ being somewhat beyond the positions of the teeth on the pawls 47 and 48.

It will be particularly observed that the feeder, when engaged by the stop 72 as shown in Figs. 11 and 12, is so positioned that the second notch 42ᵉ will be engaged by the inner feed pawl 48 upon the first feeding movement of the slide. In fact if only one feeder were to be used the first slot 42ᵉ might be entirely omitted. This first slot is however useful when two feeders are used in immediate succession as will be hereinafter explained.

Obviously the pawl or stop 72 must be withdrawn from the notch in the feeder in order to permit the feeder to be automatically advanced by the feed pawls, and a suitable means is provided for this purpose. The means for moving the stop or pawl acts in timed relation with the feeding movement of the feed slide. As shown, the pawl 72 is provided with an upstanding lug 72ᵈ and the tongue 46ᵃ on the feed slide is provided with a bevel at 46ᵉ which engages the said lug when the feed slide is moved in the feeding direction. The parts are so related that the stop or pawl 72 is cammed forward by the bevel 46ᵉ before the feed slide has moved far enough for the feed pawls 47 and 48 thereon to engage the feed slots 42ᵉ, 42ᵉ of the feeder.

Figs. 16 and 17 show the feed slide 46 advanced just far enough for the pawls 47 and 48 to engage the feeder, the stop 72 having been withdrawn from the first notch 42$^f$ of the feeder. The feed slide continues to move to the position shown in Figs. 18 and 19 and in so doing carries the feeder with it. It will be seen that the feeder has been advanced far enough to release the second cartridge, this cartridge having been fed into the chamber of the barrel in the manner already described. Immediately after reaching the position shown in Figs. 18 and 19, the slide is returned to the position shown in Figs. 11 and 12 and also shown in Figs. 20 and 21. As will be observed particularly by reference to Fig. 21, the feed pawls on the return movement are brought back to their proper positions for engaging the next following feed slots of the feeder. The feed slide moves through a distance slightly greater than the spacing between adjacent feed slots, this overtravel serving to insure proper engagement of the feed pawls with the feed slots even under the most adverse conditions.

I have stated that Figs. 18 and 19 show the feeder in the position to which it is advanced by the first feeding movement of the feed slide. However, without special provision for preventing it, the feeder might be advanced to a position much beyond that shown in Figs. 18 and 19. This might occur by reason of the inertia of the rapidly moving feeder and cartridges, or it might occur by reason of pressure manually exerted on the feeder. Manual pressure on the feeder is particularly likely to be encountered if the operator has placed a second feeder assembly on the shelf 14 in position to immediately follow the first feeder. In order to prevent any substantial or harmful overtravel of the feeder, following an automatic feeding movement, the tongue 46$^a$ of the feed slide 46 is recessed at 46$^f$ so as to permit the stop 72 to enter the next following notch 42$^f$. Fig. 18 shows the stop 72 ready to enter the next notch 42$^f$ in the event of any substantial movement of the feeder beyond the position shown.

Not only during the first but also during successive feeding movements of the feed slide 46, the stop 72 is cammed laterally by the bevel 46$^e$ on the slide so that it cannot interfere with the feeding movement of the feeder. It will thus be seen that I have made provision not only for limiting the initial manual movement of the feeder, but also for limiting each successive automatic movement thereof.

As already stated, the last notch 42$^g$ in the feeder differs from the notches 42$^f$ in that it is open at the outer end. This is necessary in order to permit the empty feeder to be readily withdrawn manually after the firing of the last cartridge. If the notch 42$^g$ were not open as shown, the feeder would be held by the stop 72. Following the last feeding movement of the feeder when the stop is entered in the notch 42$^g$, there may be overtravel of the feeder by reason of inertia. Such overtravel would be harmless as the feeder would be empty.

Also mounted on the guide member 44 is a second pawl or retainer 73 somewhat similar to the pawl or stop 72. This pawl is pivoted at 73$^a$ and it has a tooth 73$^b$ adapted to enter the successive notches 42$^f$, 42$^f$. A spring-pressed plunger 73$^c$ serves to bias the pawl in the direction to engage the feeder. The tooth 73$^b$ is beveled so as not to interfere with advancing movement of the feeder but the tooth is adapted to enter one or another of the notches 42$^f$, 42$^f$ or 42$^g$ to prevent any substantial retrograde movement of the feeder. Such retrograde movement might occur by reason of some accidental engagement of the feed slide with the feeder, or by reason of an attempt by the operator to withdraw the feeder after entering it in the feed channel. As the result of the provision of the stop and the retainer, the feeder is held in such position that feeding will necessarily occur upon the next feeding movement of the feed slide.

Some retrograde movement of the feeder is possible when the feeder is advanced to the extreme position shown in Fig. 11, but not enough for such movement to interfere with normal feeding. With the feeder in the position to which it is normally moved by the feed slide as shown in Fig. 18, only a very little retrograde movement is possible. The stop and the retainer are spaced apart by a distance subtantially greater than the normal feeding distance, so that the retainer may be effective with the feeder in either of the two positions referred to.

The two pawls 72 and 73 are provided respectively with upstanding pins 72$^e$ and 73$^d$ by means of which the pawls can be withdrawn manually. If it is desired to remove the feeder toward the left prior to firing of all of the cartridges, this can be done by first moving the retainer pawl 73 forward by means of the pin 73$^d$ and by lifting the pawls 47 and 48 by means of the button 49. If an incompletely filled feeder should be used, that is a feeder with the last one or more clips empty, it might be desirable to manually remove the feeder in the forward direction, that is toward the right. This could be done by first pressing the stop pawl 72 forward by means of the pin 72$^e$, or it could be done by manually advancing the feed slide far enough to withdraw the pawl.

It has already been pointed out that the feeder is provided at both sides with the notches 42$^f$, 42$^f$, 42$^g$ and with the bevel 42$^h$. This makes the feeder reversible so that it is not necessary for the cartridges to be mounted in a predetermined relationship with the feeder.

The ends of the feeders are so spaced from the end feeding slots 42$^e$, 42$^e$ that a second feeder can follow the first feeder in end-to-end engagement to provide uninterrupted firing. Figs. 20 and 21 show two feeders in position in the gun, one feeder being in the position A which it occupies prior to the feeding of the last cartridge and the second feeder being in the position B which is immediately adjacent the first. As already stated, the spacing between the two adjacent feed slots 42$^e$, 42$^e$ of the two feeders is approximately the same as the spacing between two adjacent feed slots of the same feeder. As shown, the spacing is slightly greater but there is not enough difference to interfere with feeding.

As shown in Fig. 21, the last engageable portion of the first feeder assembly, that is the last notch 42$^e$, is in position to be engaged by the pawl 48 and the first engageable portion of the second feeder assembly, that is the first notch 42$^e$, is in position to be engaged by the pawl 47. With the feeders or feeder assemblies in the positions shown, both of them will be moved simultaneously upon the next feeding movement of the slide; but on account of the slight difference in slot spacing both feeders are moved by the pawl 47. It will be clear that both pawls are preferable for the continuous feeding of two successive feeders in the manner described. If the pawl 48 were omitted it would be impossible to feed the last cartridge in a feeder in the position A when o subsequent feeder is in place. If the pawl 47 were omitted it would be necessary for the operator to advance the second feeder manually beyond the position B far enough for it to be engaged by the pawl 48. The disclosed construction with two teeth or two pawls makes it possible for a feeder assembly to be successively advanced when only partly entered in the feed channel, as for instance when in the position B of the second feeder assembly in Fig. 21. This construction enables the operator to let go of the second feeder assembly as soon as it reaches the position shown in Fig. 21. Thus the operator has additional time within which to put a third feeder assembly in place.

The described construction also makes it possible for a feeder or feeder assembly to be engaged at the position B shown in Fig. 21 and advanced beyond the position A, even though there may not be any other feeder immediately following it. Thus, a feeder assembly that may be the last of a series has its first engageable portion or feed slot engaged by the outer tooth $7^b$ in the position B, to start the feeding movement, and subsequently has its last engageable portion or feed slot engaged by the inner tooth $8^b$ in the position A, to complete the feeding movement. During the movement of a feeder or feeder assembly through the feed channel each engageable portion or feed slot is engaged successively by both teeth.

The rigid feeder 42 already described is shown as being adapted to carry five cartridges and a similar rigid feeder might be made for a somewhat greater number of cartridges. However, under some conditions it is desirable to provide a feeder of such greater capacity that it would not be practicable to use the same rigid construction which is exemplified by the feeder 42. In Figs. 22 to 30 I have shown an alternative feeder which is flexible and which is particularly adapted to be used with a cartridge magazine to be hereinafter described. Said flexible feeder also comprises part of the subject matter of divisional application, Serial No. 437,853, filed April , 1942. The articulated-link feeder and magazine are particularly adapted for airplane use, where continued firing may be desirable without the necessity for manual insertion of short feeder assemblies.

The flexible articulated-link feeder shown in Figs. 22 to 29 is designated in its entirety by 74. It comprises a number of intermediate links 75, a leading link 76 and a trailing link 77. Each of the links has a body portion 78 which is formed of sheet metal and bent to the shape of an inverted U as shown in Fig. 24. This is of the same size and shape as the main body portion $2^a$ of the rigid feeder 42. The depending side flanges of each body portion 78 are provided with notches or recesses $78^a$ for receiving a cartridge, each of the side flanges being thus provided with two spaced legs, $78^b$ and $78^c$. Two of the legs, as for instance the two legs $78^b$, are offset so as to fit between the adjacent legs $78^c$ of the next adjacent link. The legs that thus overlap are joined by pivot pins or rivets 79, 79. The several connected body portions 78, 78 constitute the main body portion of the articulated-link feeder. Each of the links also has a spring clip 80 for holding a cartridge, this clip being similar to the spring clips $42^c$ already referred to in connection with the feeder 42.

The spring clips 80 are each provided with slots $80^a$ and inward extending detents $80^b$ which respectively correspond in physical detail and function to the slots $42^k$ and detents $42^n$ of the rigid feeder 42, the latter being illustrated in Figs. 5, 7 and 8 and described in the foregoing.

Riveted or otherwise secured to the top of the U-shaped member 78 of each intermediate link 75 is a flat plate $75^a$ which has the same cross-sectional size and shape as the plate $42^d$ of the rigid feeder 42. A somewhat similar plate $76^a$ is provided for the leading link 76 and a somewhat similar plate $77^a$ for the trailing link 77. The several separate plates $75^a$, $76^a$ and $77^a$ are in alignment when the articulated-link feeder is straight and they constitute the top plate or guide structure of the feeder. Inasmuch as the side edges of each top plate extend beyond the U-shaped members 78, the projecting edges, in effect, constitute oppositely directed guide flanges. The top plate $76^a$ of the leading link differs in that it is considerably longer to facilitate the entry of the feeder into the feed channel of the gun as will be more apparent from the description which follows. Preferably the top plate $76^a$ carries a legend giving instructions as to the relative positioning of the cartridges. The top plates $75^a$ and $76^a$ are notched at one side at $75^b$, $76^b$, the notches being similar to the notches $42^f$ of the feeder 42 and being similarly spaced. The top plate $77^a$ of the trailing link has a notch $77^b$ which is open at outer end, being similar to the notch $42^g$ of the feeder 42. Each of the top plates $75^a$, $76^a$ and $77^a$ together with the corresponding body portions 78, are transversely slotted at $75^c$, $76^c$ and $77^c$, the spacing between the slots being the same as the spacing between the slots $42^e$ of the feeder 42.

The several plates $75^a$, $76^a$ and $77^a$ are closely adjacent when the feeder is straight. The axes of the cartridges are at least as close to the plates as are the axes of the pivotal connections at 79, 79, and preferably the pivotal axes of the cartridges are closer to the plates than are the pivotal axes. This causes the cartridges, and incidentally the plates also, to separate when the feeder is normally flexed, as shown in Fig. 28, in order to accommodate itself to the magazine in which it may be entered. It will be obvious that if the relationship of the axes were reversed the cartridges would be brought closer together upon flexing, and this would necessitate an unnecessarily large spacing between the cartridges when the feeder is straight.

Preferably the plates, although closely adjacent, have narrow spaces between them which permit the feeder to flex to a small extent in the reverse direction as shown in Fig. 29. This reverse flexing is of assistance to the operator in loading the magazine, and it avoids any likelihood of injury to the feeder as the result of careless handling.

The articulated-link feeder as shown in Figs. 22 to 29 is not reversible, it being necessary to load the cartridges in a predetermined relation to the feeder in order that the feeder may properly function with the magazine and the gun. I may, however, provide a reversible articulated-link feeder as indicated by 81 in Fig. 30. This feeder is similar to the feeder 74, the intermediate links 82 being exactly like the links 75 except that the top plates $82^a$ have notches $82^b$ at both sides. Either one of the end links 83 may be the leading link or the trailing link. The top plate $83^a$ of each link 83 is of the same length as the top plate $76^a$ of the feeder 74, and it is provided at one side with a notch $83^b$ like the notch 76ᵇ and is provided at the other side with a notch 83ᵃ like the notch 77ᵇ. The feeder 81 may be used with either end foremost.

For convenience of description a loaded articulated-link feeder with its cartridges will be referred to as an articulated-link feeder assembly. This is placed in a suitable magazine such as that which will now be described, the magazine holding it in a coiled position.

Figs. 31 to 35 show a cartridge supporting device in the form of a magazine adapted to carry an articulated-link feeder and comprising the subject matter of a divisional application, Serial No. 437,850, filed April 6, 1942. The magazine comprises two main front and rear plates 84 and 85 which are spaced apart and which are connected by longitudinal tie members 86, 87, 88 and 89. The two plates are also connected at the top by a horizontal flat plate 90 which is seated at its ends in slots in the plates. The front and rear plates 84 and 85 are provided respectively with brackets 84ᵃ and 85ᵃ which have vertical portions adapted to engage the outer face of the bracket 15 on the feed box. The brackets 84ᵃ and 85ᵃ have flat walls which are apertured to receive the same studs 15ᵃ, 15ᵃ which are used to hold the loading tray which has already been described. Carried by the brackets 84ᵃ and 85ᵃ are spring-pressed latches 91, 91, the same in construction as the spring-pressed latches 16, 16 of the loading tray. These latches are controlled by means of buttons 92, 92 which correspond to the buttons 17, 17 of the loading tray. It will be clear that the magazine can be put in place on the gun in the same position as the loading tray, the same studs 15ᵃ, 15ᵃ being utilized for holding it. Preferably the plates 84 and 85 are provided with lugs 84ᵇ and 85ᵇ which project toward the right to engage the casing of the gun and thus more rigidly support the magazine.

The rear face of the plate 84 and the front face of the plate 85 are respectively provided with helicoidal grooves 84ᵃ and 85ᵃ which are of the same shape and in longitudinal register with each other, these grooves 84ᵃ and 85ᵃ being adapted to receive respectively the points and the heads of cartridges mounted in an articulated-link feeder such as the feeder 74 or 81 already described. In the particular magazine shown, the grooves in the plates are of sufficient length to accommodate 15 cartridges but it will be understood that the invention is not in any way limited to the particular number of cartridges shown.

Secured to the plate 90, at the bottom thereof, is a guide member 90ᵃ having a T-slot 90ᵇ therein adapted to receive and guide the plates 77ᵃ, 75ᵃ and 76ᵃ constituting the guide structure of the feeder. The guide member 90ᵃ projects at the right beyond the edge of the plate 90, as clearly shown in Fig. 31, and the slot 90ᵇ is open at the top in this right hand projecting portion of the guide member. With the magazine in place, the guide means 90ᵃ in the magazine and the guide means 43, 43 in the feed channel are in register with each other.

For carrying the magazine when it is separated from the gun, there is provided a handle 93 having pintles at its ends which are seated in bearing apertures in the plates 84 and 85. When the magazine is in place on the gun, the handle may be in the position shown by full lines in Figs. 31 and 32, but when the handle is to be used for carrying the magazine it is swung upward to the position shown in dot-and-dash lines in Fig. 32.

For convenience in loading the magazine, there is preferably provided a magazine loading plate 94 which is shown in Figs. 36 and 37 and which comprises the subject matter of aforementioned divisional application, Serial No. 437,854, filed April 6, 1942. This plate 94 has upstanding end portions 94ᵃ, 94ᵃ which carry pins 94ᵇ, 94ᵇ which are similar to the pins 15ᵃ, 15ᵃ of the gun. This enables the loading plate 94 to be attached to the magazine and to be held by the same latches 91, 91 which normally serve to hold the magazine on the gun. The bottom of the loading plate 94 is so positioned that the loaded feeder is supported in exactly the proper position to enable the top plates of the feeder to readily enter the T-slot 90ᵇ in the guide member 90ᵃ of the magazine. In order to conveniently start the loading operation, the top plate of the trailing link of the feeder is placed in the open portion of the slot 90ᵇ as shown in Fig. 36. The entire articulated-link feeder assembly is then pushed into the magazine, assuming a coiled position determined by the helicoidal grooves in the plates 84 and 85.

In order that the cartridges and the feeder may be accurately positioned in the magazine, there are provided two movable fingers 95 and 96 which are rigidly connected with a longitudinal pivot pin 97 seated at its ends in bearing apertures in the plates 84 and 85. Springs 98, 98 serve to bias the pivot pin and the fingers for movement in the clockwise direction so as to yieldably hold their end portions between the first two cartridges as shown in Fig. 32. This serves to accurately position the entire feeder assembly, that is the feeder and the cartridges, with the foremost engageable portion thereof in predetermined relationship with the magazine in a direction longitudinally of the feeder. When the foremost engageable portion of the feeder assembly is disposed in the position shown in Fig. 32 with respect to the magazine, the feed slot 76ᶜ of the leading link 76 is in proper position to be engaged by the pawl tooth 47ᵇ of the feed slide when the assembled magazine and feeder assembly are attached to the feed box. The force of springs 98 is sufficient to maintain the fingers 95 and 96 in the positions shown in Fig. 32 while the magazine and feeder assembly is being secured to the feed box but the force exerted by said springs on said fingers is less than that of the feed slide when moving in feeding direction, whereby the feed slide may withdraw the feeder assembly from the magazine in order to move the cartridges into the feed channel.

The fingers 95 and 96 would interfere with the loading of the magazine if allowed to remain in their normal positions. In order that the fingers 95 and 96 may be conveniently withdrawn to permit loading, one of the fingers, as for instance 95, is provided with a tail portion 95ᵃ which is adapted to be engaged by a pin 93ᵃ on the handle 93. By moving the handle toward the right to the position shown by full lines in Figs. 36 and 37, the pin 93ᵃ is brought into engagement with the tail portion 95ᵃ of the finger so as to elevate both of the fingers to the position shown by full lines in Fig. 37. This makes it possible for the entire feeder, with the cartridges therein, to be pushed into the magazine without any interference by the fingers 95 and 96. As soon as the feeder and the cartridges are in place, the handle is released and the fingers then move to the position shown by dotted lines in Fig. 37 and also shown in Fig. 32 so as to accurately position the cartridges and the feeder. The fingers 95 and 96 do not prevent withdrawal of the feeder and the cartridges from the magazine, but they do resist such withdrawal and they thus prevent any accidental movement of the feeder and cartridges out of the magazine during such handling as may be necessary prior to the placement of the magazine on the gun.

When a magazine and an articulated-link feeder are used, it is necessary or at least desirable, to provide a chute at the right side of the gun for receiving and guiding the empty portion of the feeder. A suitable chute for this purpose is shown at 99 in Figs. 31 and 32. For holding the chute in place the right side of the feed box is provided with brackets 100, 100 which are apertured to receive pins 100ᵃ adapted to extend through suitable holes in plates 99ᵃ of the chute.

With an articulated-link feeder such as 74, mounted in a magazine secured to the side of the gun, there is no provision for engaging the feeder and the cartridges manually to advance them into the gun as is the practice with a rigid feeder such as the feeder 42. The forward end of the articulated-link feeder is in a position similar to that of a second rigid feeder as shown in Fig. 21, and the articulated-link feeder is advanced by a feeding action which is similar to that already described for the rigid feeder. However, there is no cartridge feeder assembly in the feed channel to cause the feed mechanism to operate automatically, and I therefore provide a special device for manually operating the feed slide independently of the breech mechanism of the gun to effect the initial advance of the feeder.

In Figs. 38 to 42 of the drawings, I have shown a suitable device for manually operating the feed slide independently of the breech mechanism. Said device comprises the subject matter of divisional application, Serial No. 536,906, filed May 23, 1944. The barrel extension is in its forward position, as shown for instance in Fig. 5, and the stud 59 is out of the path of movement of the slide operating lever 51. Thus the slide itself and the levers 51, 55 and 57 which normally operate it are entirely free to be moved manually.

The means moving the feed slide manually may be widely varied as to location and as to construction, but the means shown is mounted on a special cover 101 adapted to be substituted for the before-described cover 12. The special cover 101 has tongues 101ᵃ, 101ᵃ corresponding to the tongues 12ᵃ, 12ᵃ for fitting the grooves 6ᵇ, 6ᵇ in the side walls of the feed box. The cover 101 is held in place by spring latches 102, 102.

The cover 101 has an opening 101ᵇ therein through which projects the before-mentioned pin 50ᵈ which is on the block 50 secured to the feed slide 46. Mounted on the cover 101 above the opening 101ᵇ is a slide 103 longitudinally movable in guides 104, 104. Secured to the slide 103 and projecting upward therefrom is a handle 105 by means of which the slide may be manually movable. A coil compression spring 106 is interposed between a bracket 107 at the rear of the cover 101 and a bracket 108 on the slide 103. This spring is guided by a rod 109 which is secured to the bracket 107 and which has slidable engagement with the bracket 108. The rod 109 has a nut 109ᵃ at its forward end which together with a washer constitutes a stop to limit forward movement of the slide. The spring is enclosed in a tube 110 which is secured to the bracket 107 and which is slotted at the bottom to provide clearance for the lower portion of the bracket 108.

The slide 103 has a raised portion 103ᵃ which serves as a housing for a cam 111 adapted to engage the pin 50ᵈ. The cam 111 has a portion 111ᵃ rigidly secured to the slide and preferably also a portion 111ᵇ which is pivoted to the slide at 111ᶜ. A spring-pressed plunger 111ᵈ tends to hold the cam portion 111ᵇ in the relative position shown in Fig. 38.

When the slide 103 is manually moved rearward by means of the handle 105, the cam 111 engages the pin 50ᵈ to move the feed slide toward the right, that is in the feeding direction. Fig. 41 shows the slide 103 moved rearward and it will be clear that continued rearward movement of the slide beyond the position shown in Fig. 41 will cause the cam 111 to release the pin. The pin and the slide then automatically move, as indicated by the arrows, back to the normal position at the left. When the handle 105 is released the slide 103 is returned in the forward direction by the spring 106 and the pin 50ᵈ then pushes the portion 111ᵈ of the cam toward the right to provide clearance. This construction makes it possible for the feed slide to instantly return to its normal position, without waiting for the return or forward movement of the slide 103. It will be seen that a single movement of the slide 103 rearward and again forward causes one complete feeding movement of the feed slide.

Fig. 43 is a view in some respects similar to Fig. 12, but showing the magazine and discharge chute in place on the gun. The pins 15ᵃ, 15ᵃ, shown on the feed box in Figs. 11, 31, 32, and 38, guide the magazine so that it moves horizontally into its final position. In so moving, the top plate 76ᵃ of the leading link is entered in the space above the guide members 43, 43. The exact relative positioning of the feeder assembly as shown in Fig. 43 is insured by the engagement of the fingers 95 and 96 with the cartridges as already explained. With the feeder assembly in this position, the tooth on the feed pawl 47 is outside of the feed box and is entered in the foremost feed slot of the feeder, that is the slot 76ᶜ in the leading link 76. Then by manipulating the slide 103 twice in the manner already described, the feeder can be advanced to the position shown by dot-and-dash lines in Fig. 43 thus effecting the loading of the first cartridge in the manner already described in conjunction with Figs. 11, 12, 14 and 15. It will be observed that the grooves 43ᶜ, 43ᶜ in the guide plates 43, 43 provide clearance for the heads of the rivets 79, 79 of the feeder.

With the first cartridge loaded as described, the operation of the gun takes place as before-described, when the trigger 68 is pulled. The fingers 95 and 96 of the magazine are cammed out of the way by the cartridges and do not interfere with the feeding action. The forward end portion of the feeder passes into the chute 99 and is guided downward as shown in Fig. 44.

It will be understood that during the operation of the gun the pawls 72 and 73 function with the articulated-link feeder in the same manner that they function with the rigid feeder. The only essential difference is that the articulated-link feeder does not have a bevel corresponding to the bevel 42ʰ. This is unnecessary for the reason that the articulated-link feeder is advanced only by the action of the feed slide, and when the feeder is so advanced the feed slide itself moves the pawl 72 out of the way, no bevel on the feeder being necessary. The cam 46ª on the feed slide is of sufficient length to hold the stop pawl 72 out of engagement with the feeder at each movement thereof, until the joint between the top plates has moved beyond the pawl. This avoids any possibility of entry of the tooth 72ᵇ of the pawl into the joint space, with resultant breaking or jamming.

It will be observed that the inner pawl 48 on the feed slide is not needed, and in fact is not used, for starting the feeding movement of the articulated-link feeder as shown in Fig. 43. After the first feeding step, the two pawls act simultaneously, but at the time of the feeding of the last cartridge the feeder has passed beyond the range of action of the pawl 47 as shown in Fig. 44. The feeding of the last cartridge is effected solely by the pawl 48. Thus both pawls are necessary, one for starting the feeding and the other for completing it.

Upon the feeding of the last cartridge, the stop pawl 72 will be entered in the open ended notch 77ᵇ of the feeder, the feeder then being free to be withdrawn from the gun. Final withdrawal of the feeder may take place by gravity or if necessary by manual action.

What I claim is:

1. In an automatic firearm, the combination of a casing and feed box having sides and provided with a feed channel extending transversely therethrough, said sides having openings respectively defining opposite ends of said feed channel, a feed slide reciprocable within said feed channel and having a pawl for engaging a cartridge feeder assembly to move it intermittently through the feed channel, an actuating block removably attached to one surface of the feed slide for movement therewith and projecting outward from the feed channel in a direction substantially perpendicular to the path of movement of said feed slide, said block being adapted for movement between the sides of the feed box and portions of said sides extending into the path of movement of said block, whereby said block is adapted to engage said portions of said sides to prevent removal of said feed slide from said feed channel, a top for said casing and feed box constructed and arranged to be removed therefrom independently of said block and render said block accessible for removal from said slide, and mechanism in the firearm engaging the actuating block and serving to reciprocate the block and slide in timed relationship with the functioning of the firearm.

2. In an automatic firearm, the combination of a casing and feed box having sides and provided with a feed channel extending transversely therethrough, said sides having openings respectively defining opposite ends of said feed channel, a feed slide reciprocable in a substantially horizontal plane within said feed channel and having a pawl and adapted to engage a cartridge feeder assembly to move it intermittently through the feed channel, the feed slide being constructed and arranged to be freely inserted in or removed from one end of the feed channel, an actuating block removably attached to the top surface of the feed slide for movement therewith and projecting upward from the feed channel and portions of said sides extending into the path of movement of said block, whereby said block is adapted to engage said portions of said sides to prevent removal of said feed slide from said feed channel, said block being provided with a recess in one surface thereof, a top for said casing and feed box constructed and arranged to be removed therefrom independently of said block and render said block accessible for removal from said slide, and mechanism in the firearm including a member automatically moved during the functioning of the firearm and having a portion disposed in said recess in said actuating block to cause said block and slide to reciprocate in timed relationship with the functioning of the firearm.

3. In an automatic firearm, the combination of a casing, a barrel at the front thereof, a feed box on said casing and having a transverse feed channel therein adapted to receive a feeder having means for holding a plurality of spaced cartridges and the feeder also having a series of feed slots spaced in accordance with the cartridge spacing, a feed slide automatically reciprocable in said feed channel in timed relationship with the functioning of the firearm, two feed pawls separately and movably connected with the slide and each having a tooth adapted to operatively engage successively with the feed slots of a feeder to move the feeder intermittently through the feed channel, said teeth on the pawls being spaced apart in the direction of slide reciprocation by a distance approximately equal to the distance between the said feed slots, and means including a single manually operable member carried by the feed slide and interconnectible with said pawls and adapted upon actuation to simultaneously move and withdraw both teeth from engagement with the feeder in order to permit the feeder to be withdrawn from the feed channel in the retrograde direction.

4. In an automatic firearm, the combination of a casing, a barrel at the front thereof, a feed box on said casing and having a transverse feed channel therein adapted to receive a feeder having means for holding a plurality of spaced cartridges and the feeder also having a series of feed slots spaced in accordance with the cartridge spacing, a feed slide automatically reciprocable in said feed channel in timed relationship with the functioning of the firearm, two feed pawls separately and movably connected with the slide and each having a tooth adapted to operatively engage successively with the feed slots of the feeder to move the feeder intermittently through the feed channel, the said teeth on the pawls being spaced apart in the direction of slide reciprocation by a distance approximately equal to the distance between the said feed slots, manually operable means engageable with one pawl and adapted when actuated to withdraw the tooth thereof from engagement with the feeder, and means constructed and arranged to interconnect the two pawls during the withdrawal movement of said one pawl whereby the tooth of said second pawl is adapted to be substantially simultaneously withdrawn from engagement with the feeder.

5. In an automatic firearm, the combination of a casing and feed box having a transverse feed channel therein, a barrel at the front of the casing, a feed slide automatically reciprocable in said feed channel in timed relationship with the functioning of the firearm and having a pawl adapted to engage a cartridge-holding feeder to move it intermittently through the feed channel, means adapted upon movement of the feeder in the feeding direction to engage and cause each foremost cartridge as it reaches a predetermined position in the feed channel to be disengaged from the feeder and moved into the chamber of the barrel, a stop adjacent said feed channel and constructed and arranged to operate so as to engage the feeder at the commencement and also at the end of each feeding movement of the feed slide to limit the movement of the feeder in the feeding direction, and stop actuating means constructed and arranged to automatically move the stop out of its operative position after commencement of movement of the slide in feeding direction so as to permit the slide to move the foremost cartridge in the feeder into engagement with said disengaging means.

6. In an automatic firearm, the combination of a casing and feed box having a transverse feed channel therein, a barrel at the front of the casing, a feeder adapted to hold a plurality of spaced cartridges and also adapted to be manually pushed into the feed channel to effect the initial insertion of said feeder therein, a feed slide automatically reciprocable in said feed channel in timed relationship with the functioning of the firearm and having a pawl for engaging the feeder to move it intermittently through the feed channel, means adapted upon movement of the feeder in the feeding direction to engage and cause each foremost cartridge as it reaches a predetermined position in the feed channel to be disengaged from the feeder and moved into the chamber of the barrel, a stop adjacent said feed channel and constructed and arranged to operate so as to engage the feeder at the commencement and also at the end of each feeding movement of the feed slide to limit the movement of the feeder in the feeding direction, and stop actuating means constructed and arranged to automatically move the stop out of its operative position after commencement of movement of the slide in feeding direction so as to permit the slide to move the foremost cartridge in the feeder into engagement with said disengaging means.

7. In an automatic firearm, the combination of a casing and feed box having a transverse feed channel therein, a barrel at the front of the casing, a feed slide automatically reciprocable in said feed channel in timed relationship with the functioning of the firearm and having a pawl adapted to engage a cartridge-holding feeder to move it intermittently through the feed channel, a stop constructed and arranged to operate so as to engage the feeder at the commencement and also at the end of each feeding movement of the feed slide to limit the movement of the feeder in the feeding direction, cartridge disengaging means adapted upon movement of the feeder in the feeding direction to cause each foremost cartridge therein as it reaches substantially central position in the feed box to be disengaged from the feeder and moved into the chamber of the barrel, the said cartridge disengaging means being constructed and arranged to disengage the cartridge prior to limitation of feeder movement by the stop, and stop actuating means constructed and arranged to automatically move the stop out of its operative position after commencement of movement of the slide in feeding direction so as to permit the slide to move the foremost cartridge in the feeder into engagement with said disengaging means.

8. In an automatic firearm, the combination of a casing and feed box having a transverse feed channel therein, a barrel at the front of the casing, a feed slide automatically reciprocable in said feed channel in timed relationship with the functioning of the firearm and having a pawl adapted to engage a cartridge-holding feeder to move it intermittently through the feed channel, cartridge disengaging means adapted upon movement of the feeder in the feeding direction to disengage from the feeder each foremost cartridge therein as it reaches a predetermined position in the feed channel, whereby it may be then moved into the chamber of the barrel, a stop adjacent said feed channel and adapted to operate to limit the movement of the feeder in the feeding direction at the commencement and also at the end of the feeding movement of the feed slide, and a cam on the feed slide constructed and arranged to automatically move the stop out of its operative position after commencement of feeding movement of the slide so as to permit the slide to move the foremost cartridge in the feeder into engagement with said disengaging means.

9. In an automatic firearm, the combination of a casing and feed box having a transverse feed channel therein, a barrel at the front of the casing, a feeder adapted to hold a plurality of spaced cartridges and also adapted to be manually pushed into the feed channel to effect the initial insertion of said feeder therein, the said feeder having a notch therein spaced from its front end and also having a bevel at its front end, a feed slide automatically reciprocable in said feed channel in timed relationship with the functioning of the firearm and having a pawl for engaging the feeder to move it intermittently through the feed channel, means adapted upon movement of the feeder in the feeding direction to engage and cause each foremost cartridge as it reaches a predetermined position in the feed channel to be disengaged from the feeder and moved into the chamber of the barrel, a stop constructed and mounted so as to be normally in the path of movement of the feeder and adapted to be engaged and cammed aside by the bevel on the feeder during the initial insertion thereof into said feed channel, whereby the foremost cartridge in the feeder may be moved into engagement with said disengaging means, the said stop being adapted to thereafter directly engage the said notch in the feeder to limit further movement of the feeder in the feeding direction, and stop actuating means constructed and arranged to automatically move the stop out of its feeder engaging position after commencement of feeding movement of the slide so as to permit the slide to move the then foremost cartridge in the feeder into engagement with said disengaging means.

10. In an automatic firearm, the combination of a casing and feed box having a transverse feed channel therein, a barrel at the front of the casing, a feeder adapted to hold a plurality of spaced cartridges and having a plurality of longitudinally spaced notches, a feed slide automatically reciprocable in said feed channel in timed relationship with the functioning of the firearm and having a pawl for engaging the feeder to move it intermittently through the feed channel, means adapted upon successive movements of the feeder in the feeding direction to engage and cause each successive foremost cartridge as it reaches substantially central position in said feed box to be disengaged from the feeder and moved into the chamber of the barrel, a stop adjacent said feed channel and constructed and arranged to normally successively engage the respective feeder notches both at the commencement and also at the end of each feeding movement of the feed slide to limit successive movements of the feeder in the feeding direction, and means constructed and arranged to automatically move the stop out of its notch engaging position at the commencement of each feeding movement of the slide so as to permit the slide to move each successively foremost cartridge in the feeder into engagement with said disengaging means.

11. In an automatic firearm, the combination of a casing and feed box having a transverse feed channel therein provided with an entrance and exit, a barrel at the front of the casing, a feeder adapted to hold a plurality of spaced cartridges and having a plurality of longitudinally spaced notches with the rearmost notch open at the rear, a feed slide automatically reciprocable in said feed channel in timed relationship with the functioning of the firearm and having a pawl for engaging the feeder to move it intermittently through the feed channel from the entrance thereof, means adapted upon successive movements of the feeder in the feeding direction to engage and cause each successive foremost cartridge as it reaches substantially central position in said feed box to be disengaged from the feeder and moved into the chamber of the barrel, a stop adjacent said feed channel and constructed and arranged to normally successively engage the respective feeder notches at the commencement and also at the end of each feeding movement of the feed slide to limit successive movements of the feeder in the feeding direction, the last notch which is open at the rear receiving said stop following the removal of the last cartridge from said feeder and permitting removal of the feeder past said stop and from the exit of said feed channel, and stop actuating means constructed and arranged to automatically move the stop out of its notch engaging position after the commencement of each feeding movement of the slide so as to permit the slide to successively move each foremost cartridge in the feeder into engagement with said disengaging means.

12. In an automatic firearm, the combination of a casing and feed box having a transverse feed channel therein, a barrel at the front of the casing, a feeder adapted to hold a plurality of spaced cartridges and having a plurality of longitudinally spaced notches, a feed slide automatically reciprocable in said feed channel in timed relationship with the functioning of the firearm and having a pawl for engaging the feeder to move it intermittently through the feed channel, means adapted upon successive movements of the feeder in the feeding direction to engage and cause each successive foremost cartridge as it reaches substantially central position in said feed box to be disengaged from the feeder and moved into the chamber of the barrel, a stop adjacent said feed channel and constructed and arranged to successively engage the respective feeder notches at the commencement and also at the end of each feeding movement of the feed slide to limit each successive movement of the feeder in the feeding direction, means constructed and arranged to automatically move the stop out of its notch engaging position after the commencement of each feeding movement of the slide so as to permit the slide to successively move each foremost cartridge in the feeder into engagement with said disengaging means, and a retainer positioned and adapted to engage the respective feeder notches to prevent any substantial retrograde movement of the feeder following each movement of the foremost cartridge therein into engagement with said disengaging means.

13. In an automatic firearm, the combination of a casing and feed box having a transverse feed channel therein, a barrel at the front of the casing, a feeder adapted to hold a plurality of spaced cartridges and having a plurality of longitudinally spaced notches, a feed slide automatically reciprocable in said feed channel in timed relationship with the functioning of the firearm and having a pawl for engaging the feeder to move it intermittently through the feed channel, means adapted upon successive movements of the feeder in the feeding direction to engage and cause each successive foremost cartridge as it reaches substantially central position in said feed box to be disengaged from the feeder and moved into the chamber of the barrel, a stop adjacent said feed channel and constructed and arranged to normally successively engage the respective feeder notches at the commencement and also at the end of each feeding movement of the feed slide to limit each successive movement of the feeder in the feeding direction, means constructed and arranged to automatically move the stop out of its notch engaging position after the commencement of each feeding movement of the slide so as to permit the slide to successively move each foremost cartridge in the feeder into engagement with said disengaging means, and a retainer positioned and adapted to engage the respective feeder notches to prevent any substantial retrograde movement of the feeder following each movement of the foremost cartridge therein into engagement with said disengaging means, the said retainer being spaced from the stop by a distance substantially greater than the spacing between the feeder notches.

GEORGE WEBB.